US010995261B2

(12) United States Patent
Holtsclaw et al.

(10) Patent No.: US 10,995,261 B2
(45) Date of Patent: May 4, 2021

(54) SURFACTANT FLOWBACK AIDS FOR USE IN SUBTERRANEAN FORMATION OPERATIONS

(71) Applicant: Halliburton Energy Services, Inc., Houston, TX (US)

(72) Inventors: Jeremy Holtsclaw, Kingwood, TX (US); Kristina Henkel Holan, Cypress, TX (US); Kurt Hoeman, Houston, TX (US); Golchehreh Salamat, Houston, TX (US); Tatyana Khamatnurova, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/329,683

(22) PCT Filed: Dec. 13, 2016

(86) PCT No.: PCT/US2016/066269
§ 371 (c)(1),
(2) Date: Feb. 28, 2019

(87) PCT Pub. No.: WO2018/111229
PCT Pub. Date: Jun. 21, 2018

(65) Prior Publication Data
US 2019/0194526 A1      Jun. 27, 2019

(51) Int. Cl.
*C09K 8/60*      (2006.01)
*C09K 8/68*      (2006.01)
(Continued)

(52) U.S. Cl.
CPC .............. *C09K 8/602* (2013.01); *C09K 8/035* (2013.01); *C09K 8/06* (2013.01); *C09K 8/68* (2013.01); *C09K 8/70* (2013.01)

(58) Field of Classification Search
None
See application file for complete search history.

(56) References Cited

U.S. PATENT DOCUMENTS

| 4,537,701 A | 8/1985 | Oppenlaender et al. |
| 5,547,022 A * | 8/1996 | Juprasert ............... C09K 8/602 |
| | | 166/263 |

(Continued)

FOREIGN PATENT DOCUMENTS

| WO | 2001-023703 A1 | 4/2001 |
| WO | 2017-151158 A | 9/2017 |
| WO | 2017-151159 A1 | 9/2017 |

OTHER PUBLICATIONS

Pradilla et al.,"Mixed Interfaces of Asphaltenes and Model Demulsifiers, Part II: Study of Desorption Mechanisms at Liquid/Liquid Interfaces", Energy & Fuels 2015 29(9), pp. 5507-5518.
(Continued)

*Primary Examiner* — Jeffrey D Washville
(74) *Attorney, Agent, or Firm* — McGuire Woods LLP

(57) ABSTRACT

The embodiments herein relate generally to subterranean formation operations and, more particularly, to surfactant flowback aids for use in subterranean formation operations. The surfactant flowback aid composition may comprise an aqueous phase comprising an aqueous base fluid, a surfactant blend, and a demulsifier. The surfactant blend may comprise a C8-C18 alcohol ethoxy-late; a fatty acid alkanolamide; and optionally, a surfactant selected from the group consisting of a non-ionic surfactant, an anionic surfactant, a cationic surfactant, an amphoteric surfactant, and any combination thereof. The demulsifier may be selected from the group consisting of a desalter agent to separate water from crude oil, a treater agent to flocculate submicron particulates from crude oil, and any combination thereof.

20 Claims, 2 Drawing Sheets

(51) Int. Cl.
  *C09K 8/70* (2006.01)
  *C09K 8/035* (2006.01)
  *C09K 8/06* (2006.01)

(56) References Cited

U.S. PATENT DOCUMENTS

| | | | |
|---|---|---|---|
| 8,435,927 B2 | 5/2013 | Elsik | |
| 8,573,302 B2 | 11/2013 | Robb et al. | |
| 9,284,512 B2 | 3/2016 | Snead et al. | |
| 2009/0149557 A1 | 6/2009 | Talingting-Pabalan et al. | |
| 2013/0261033 A1* | 10/2013 | Nguyen | C09K 8/602 507/240 |
| 2013/0261227 A1* | 10/2013 | Nguyen | C10G 31/08 523/403 |
| 2015/0126417 A1* | 5/2015 | Hatchman | C09K 8/584 507/219 |
| 2016/0152388 A1 | 6/2016 | Alwattan et al. | |

OTHER PUBLICATIONS

Schorling et al.,"Influence of the crude oil resin/asphaltene ratio on the stability of oil/water emulsions," Colloids and Surfaces A:Physicochemical and Engineenng Aspect, 1999, 152, pp. 95-102.
Temple-Heald et al., "Developing New Surfactant Chemistry for Breaking Emulsions in Heavy Oil," J. Petrol. Tech. Jan. 2014, pp. 30-36.
Rondon et al., "Breaking of Water-in-Crude Oil Emulsions. 1. Physicochemical Phenomenology of Demulsifier Action," Energy fuels, 2006, 20, pp. 1600-1604.
BASF Corporation, Global Oilfield Solutions: Demulsifiers for the Oil Industry: Basorol® (2015) (6 pages).
BASF Corporation, Production Chemicals: Oil Water Separation: Demulsifiers, Deoilers; Basorol® (2013) (9 pages).
International Search Report & Written Opinion issued in corresponding International Application No. PCT/US2016/056269 dated Sep. 13, 2017. (14 pages).

* cited by examiner

SURFACTANT FLOWBACK AIDS FOR USE IN SUBTERRANEAN FORMATION OPERATIONS

BACKGROUND

The embodiments herein relate generally to subterranean formation operations and, more particularly, to surfactant flowback aids for use in subterranean formation operations.

During certain subterranean formation operations (e.g., stimulation operations, such as hydraulic fracturing), treatment fluids penetrate a particular radius within the subterranean formation. The term "treatment fluid," as used herein, refers generally to any fluid that may be used in a subterranean application in conjunction with a desired function and/or for a desired purpose. The term "treatment fluid" does not imply any particular action by the fluid or any component thereof. A portion of the desirable oil and/or gas hydrocarbons and/or treatment fluid may remain trapped in the pore spaces of the subterranean formation, thereby reducing or prohibiting production of the hydrocarbons. For example, oil hydrocarbon droplets may be too large relative to the pore throats of the formation, causing the hydrocarbons to be trapped and unable to be produced.

Flowback aids may be used to recover trapped hydrocarbons and introduced treatment fluids from subterranean formations. Such flowback aids may be used to reduce damage to a formation due to imbibed fluids in the formation and propped fractures, increase permeability of a formation and effective flow area, enhance recovery of produced hydrocarbons, and the like. Surfactants may be used as flowback aids to increase the drainage speed (i.e., dewatering) of introduced hydrocarbons and/or treatment fluids from a formation. Surfactants (alone or in combination with other compounds) may be used to demulsify various emulsions (e.g., oil-in-water or water-in-oil emulsions) to separate crude oil from the aqueous phase of an emulsion. Demulsification may be important, for example during stimulation (e.g., hydraulic fracturing) operations because the presence of emulsions may increase the viscosity of fracturing fluids or produced fluids, decreasing the effective permeability thereof, and thus have a negative impact on overall production.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
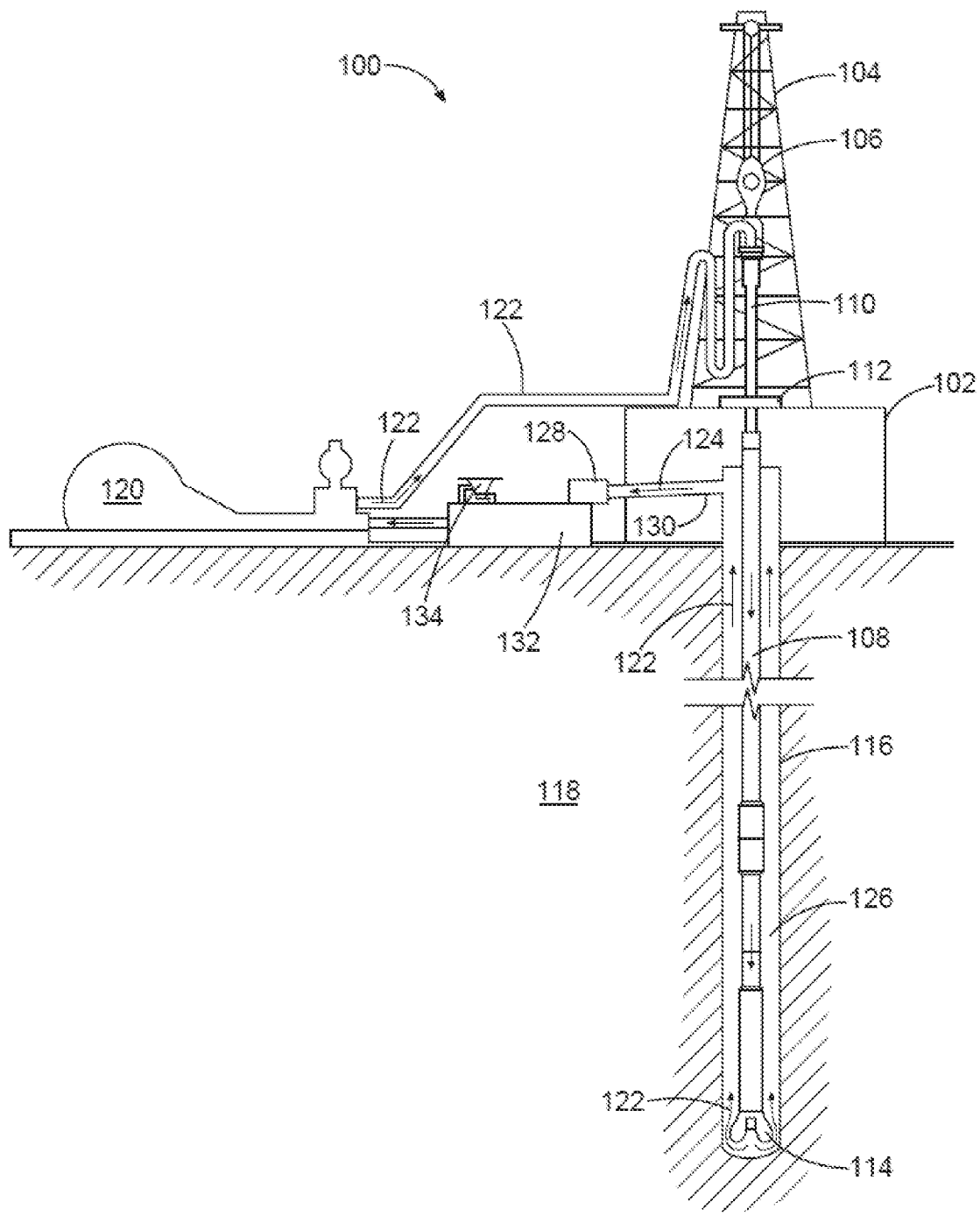
FIG. 1 illustrates a drilling assembly, in accordance with one or more embodiments of the present disclosure.

The embodiments herein relate generally to subterranean formation operations and, more particularly, to surfactant flowback aids for use in subterranean formation operations.

The embodiments of the present disclosure provide for flowback aid compositions comprising various components, which may be in the form of a mesophase emulsion, a microemulsion, or a nanoemulsion. The flowback aid compositions are distinguished from flowback fluid, defined as other introduced treatment fluids and and/or connate fluids mixed therein that are not the flowback aid compositions described herein. The flowback aid compositions comprise one or more demulsifier compounds for efficient and effective separation of crude oil from an aqueous fluid phase, as well as one or more surfactants for stabilization of the flowback aid composition. The demulsifiers described herein are included in the various emulsions (which may have a separate oil phase, as described below) have demonstrated properties for rapidly separating water from oil present in a subterranean formation (e.g., in emulsion form), particularly water separation from crude oil.

The embodiments further include methods of introducing the flowback aid compositions into a subterranean formation to reduce or eliminate an emulsion present within the subterranean formation, reduce or eliminate the formation of an emulsion within the subterranean formation, or any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

In the methods described herein, the acts can be carried out in any order without departing from the scope of the present disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments, the present disclosure provides a flowback aid composition comprising an aqueous phase of at least an aqueous base fluid, a demulsifier, and a surfactant blend of (1) a $C_8$-$C_{18}$ alcohol ethoxylate, (2) a fatty acid alkanolamide, and optionally (3) a surfactant selected from the group consisting of a non-ionic surfactant, an anionic surfactant, a cationic surfactant, an amphoteric surfactant, and any combination thereof. As used herein, the term "surfactant," and grammatical variants thereof, refers to a chemical that preferentially adsorbs to an interface and which lowers the surface tension or interfacial tension between phases of matter (e.g., liquid, liquid crystalline, crystalline, solid, and the like), such as in an emulsion. The term "amphoteric surfactant," and grammatical variants thereof, as used herein, includes surfactants that may form cationic or anionic species, as well as those that simultaneously possess both states, referred to as zwitterionic. The term "demulsifier," and grammatical variants thereof, as used herein, refers to a chemical used to break emulsions, primarily water-in-crude oil emulsions, into separate phases. In some embodiments, the flowback aid composition further comprises an oil phase composed of a high-solvency oil.

In some embodiments, the aqueous phase of the flowback aid composition comprises about 10% to about 80% by weight of the flowback aid composition, encompassing any value and subset therebetween. When included, the oil phase, in some embodiments, may be about 10% to about 80% by weight of the flowback aid composition. In one or all embodiments, the surfactant blend may comprise about 10% to about 50% by weight of the flowback aid composition, encompassing any value and subset therebetween; and the demulsifier may comprise about 5% to about 30% by weight of the flowback aid composition, encompassing any value and subset therebetween.

The demulsifier for use in the flowback aid compositions described herein may be generally selected from the group consisting of a desalter agent, a treater agent, and any combination thereof. As used herein, the term "desalter agent," and grammatical variants thereof, refers to a compound capable of separating water (including aqueous fluids in general) from crude oil. Such "desalter agents" may additionally be referred to in the oil and gas industry and "polisher agents." A "treater agent," and grammatical variants thereof, as used herein, refers to a compound capable of flocculating submicron (i.e., having a unit mesh size of less than about 1 micrometer (μm)) particulates from crude oil.

As used herein, the term "unit mesh size," and grammatical variants thereof, refers to a size of an object (e.g., a particulate) that is able to pass through a square area having each side thereof equal to a specified numerical value.

In some embodiments, the flowback aid composition is in the form of a mesophase emulsion. As used herein, the term "mesophase emulsion" (or simply "mesophase"), and grammatical variants thereof, refers to an emulsion having a separate phase characterized as a liquid crystalline compound between the crystalline and the isotropic liquid phase. That is, a mesophase emulsion includes a separate phase that is neither an aqueous phase nor an oil phase, but a liquid crystalline phase of both hydrophobic and hydrophilic nature. The combination of the aqueous phase, surfactant blend, and demulsifier of the flowback aid composition described herein may result in a number of different mesophase emulsion physical structures depending, for example, on the type and ratio of the various components in the flowback aid composition, temperature, shear rate exposure, and the like, and any combination thereof. In some embodiments, the mesophase is opalescent in color and may take on various physical structures including, but not limited to, lamellar, vesicular, cubic, and hexagonal structures. In some embodiments, the mesophase emulsion of the flowback aid composition is preferably in a lamellar structure.

In other embodiments, the flowback aid composition described herein further includes an oil phase comprising a high-solvency oil. In such instances, the flowback aid composition may maintain the form of a mesophase (when only small amounts of the high-solvency oil are included), or take the form of a microemulsion or a nanoemulsion depending at least on the amount and type of the high-solvency oil comprising the oil phase. Accordingly, in some embodiments, the flowback aid composition comprises an aqueous phase and an oil phase. The flowback aid composition comprising an oil phase may be in the form of a Winsor Type I, a Winsor Type II, a Winsor Type III, or a Winsor Type IV emulsion. In preferred embodiments, the flowback aid composition comprising an oil phase is a Winsor Type IV microemulsion or nanoemulsion. In some embodiments, the aqueous phase is the outer phase and the oil phase is the inner phase. In other embodiments, the oil phase is the outer phase and the aqueous phase is the inner phase. As used herein, the term "microemulsion," and grammatical variants thereof, refers to a thermodynamically stable emulsion having droplets in the inner phase of the emulsion (dispersed within the outer phase) with average unit mesh sizes in the range of greater than 5 nm to about 200 nm, encompassing any value and subset therebetween. As used herein, the term "nanoemulsion," and grammatical variants thereof, refers to a kinetically stable emulsion having droplets in the inner phase of the emulsion (dispersed within the outer phase) with average unit mesh sizes in the range of 20 nanometers (nm) to 600 nm, encompassing any value and subset therebetween. A key distinction between the microemulsions and nanoemulsions described herein is that microemulsions are thermodynamically stable and nanoemulsions are kinetically stable.

In some embodiments, as the flowback aid composition is dosed into a treatment fluid and form microemulsions, the microemulsions may exist as oil-in-water microemulsions (optically clear) in the treatment fluid or transition to form nanoemulsions, both described herein. The nanoemulsion may exist as a hazy solution, for example, of the flowback aid composition (including any high-solvency oil) dispersed within the treatment fluid(s) as swollen micelles stabilized by the components of the surfactant blend. These micelles accordingly facilitate delivery of the components of the flowback aid composition to the formation and its connate fluids, allowing efficient and effective delivery of demulsifier(s) molecules to crude oil in well production conditions and the surfactant blend ensures low interfacial tension between the crude oil and water for improved production. Advantageously, delivery of demulsifer(s) downhole results in the return of fluids to the surface having minimal cumbersome crude oil emulsion formation, thus facilitating the rapid separation of bulk crude oil from also produced (whether from the formation or in combination with a treatment fluid) bulk aqueous fluids.

As previously provided, the type and amount of high-solvency oil and other components within the flowback aid composition may be used to determine the type of emulsion. In some embodiments, the amount of high-solvency oil present in the flowback aid composition is about 2% to about 40% by weight of the flowback aid composition, encompassing any value and subset therebetween, and wherein the flowback aid composition is one of a microemulsion or a nanoemulsion.

In some embodiments, the various flowback aid compositions, whether comprising a high-solvency oil or additional additives (e.g., flowback additives and other ingredients) exhibit a RockPerm$^{SM}$ Value (RPV), as described herein, of from about 1 to about 100, encompassing any value and subset therebetween. Moreover, the various flowback aid compositions are stable at a wide range of temperatures including at high temperatures, such as those of from about 50° C. to about 400° C., encompassing any value and subset therebetween. Further, the flowback aid compositions may be stable under a wide range of salinity conditions, thus allowing their use in multiple environments and in multiple types of treatment fluids, such as salinities of from about 0 milligrams per liter (mg/L) of total dissolved solids to about 250,000 mg/L, or salt concentrations of from about 1,000 parts per million (ppm) to about 300,000 ppm, encompassing any value and subset therebetween. Such salts may include, but are not limited to, NaBr, $CaCl_2$, $CaBr_2$, $ZnBr_2$, KCl, NaCl, a carbonate salt, a sulfonate salt, sulfite salts, sulfide salts, a phosphate salt, a phosphonate salt, a magnesium salt, a bromide salt, a formate salt, an acetate salt, a nitrate salt, and the like, and any combination thereof at any suitable concentration. In specific embodiments, the flowback aid composition may be stable in the presence of a concentration of at least one of NaBr, $CaCl_2$, $CaBr_2$, $ZnBr_2$, KCl, and NaCl of about 0.1% weight per volume (w/v) to about 20% w/v of the flowback aid composition, encompassing any value and subset therebetween. Beneficially, and as discussed herein, the flowback aid composition may have a reduced freezing point compared to other compositions lacking the specific components described herein, such that the flowback aid composition has a freezing point below about 10° C., such as from about 10° C. to about −50° C. or less, encompassing any value and subset therebetween.

In some embodiments, the present disclosure provides a method of introducing the flowback aid composition into a subterranean formation to perform a subterranean formation operation. Such subterranean formation operations may include, but are not limited to, a drilling operation, a stimulation operation (e.g., hydraulic fracturing, frac packing, perforating, and the like), a completion operation (e.g., a cement operation), a production operation, an acidizing operation, a clean-up operation (e.g., to remove debris or undesirable material from a formation), a spotting operation (e.g., for localized treatment in a formation), a remedial operation (e.g., an enhanced oil recovery operation), and the like, and any combination thereof. The flowback aid composition may be used during such subterranean formation operations to reduce or eliminate an emulsion present within a subterranean formation, reduce or eliminate the formation of an emulsion within a subterranean formation, or any combination thereof. The flowback aid composition may be used alone or incorporated with one or more treatment fluids to perform these operations (e.g., a drilling treatment fluid (oil-based or water-based), a pill treatment fluid, a drilling treatment fluid, a cement treatment fluid, and the like). The amount of flowback aid composition incorporated into a particular treatment fluid is such that the treatment fluid and the flowback aid composition are able to perform their particular function.

As described above, the flowback aid composition of the present disclosure comprises at least (A) an aqueous base fluid, (B) a surfactant blend of (1) a $C_8$-$C_{18}$ alcohol ethoxylate, (2) a fatty acid alkanolamide, and optionally (3) a surfactant selected from the group consisting of a non-ionic surfactant, an anionic surfactant, a cationic surfactant, an amphoteric surfactant, and any combination thereof, and (C) a demulsifier selected from the group consisting of a desalter agent to separate water from crude oil, a treater agent to flocculate submicron particulates from crude oil, and any combination thereof.

The aqueous base fluid may be any aqueous base fluid capable of use in a subterranean formation and compatible with the other components of a particular flowback aid composition. Suitable aqueous base fluids may include, but are not limited to, fresh water, saltwater (e.g., water containing one or more salts dissolved therein), brine (e.g., saturated salt water), seawater, wastewater, produced water, and any combination thereof.

Various chemical formula and compounds are described below with reference to the components of the flowback aid composition described herein. For reference, terms used herein are defined as follows.

As used herein, the term "substituted," and grammatical variants thereof, in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo (carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)0-2N(R)C(O)R, (CH$_2$)0-$_2$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, $(C_1$-$C_{100})$hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl," as used herein, and grammatical variants thereof, refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, npropyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. The term "alkyl" encompasses nalkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

As used herein, the term "alkenyl," and grammatical variants thereof, refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to, vinyl, —CH═CH($CH_3$), —CH═C($CH_3$)$_2$, —C($CH_3$)═$CH_2$, —C($CH_3$)═CH($CH_3$), —C($CH_2CH_3$)═$CH_2$, cyclohexenyl, cyclopentenyl, cyclohexadienyl, butadienyl, pentadienyl, and hexadienyl among others.

As used herein, the term "acyl," and grammatical variants thereof, refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl," as used herein, and grammatical variants thereof, refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl," as used herein, and grammatical variants thereof, refers to aromatic and non-aromatic ring compounds containing three or more ring members, of which one or more is a heteroatom such as, but not limited to, N, O, and S.

As used herein, the term "alkoxy," and grammatical variants thereof, refers to an oxygen atom connected to an alkyl group, including a cycloalkyl group, as are defined herein. Examples of linear alkoxy groups include, but are not limited to, methoxy, ethoxy, propoxy, butoxy, pentyloxy, hexyloxy, and the like. Examples of branched alkoxy include, but are not limited to, isopropoxy, secbutoxy, tert-butoxy, isopentyloxy, isohexyloxy, and the like. Examples of cyclic alkoxy include, but are not limited, to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine," and grammatical variants thereof, as used herein, refers to primary, secondary, and tertiary amines having, e.g., the formula N(group)$_3$ wherein each group can independently be H or non-H, such as alkyl, aryl, and the like. Amines include, but are not limited, to R—$NH_2$, for example, alkylamines, arylamines, alkylarylamines; $R_2$NH wherein each R is independently selected, such as dialkylamines, diarylamines, aralkylamines, heterocyclylamines and the like; and $R_3$N wherein each R is independently selected, such as trialkylamines, dialkylarylamines, alkyldiarylamines, triarylamines, and the like. The term "amine" also includes ammonium ions as used herein.

As used herein, the term "amino group," and grammatical variants thereof, refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, and grammatical variants thereof, as used herein, by themselves or as part of another substituent, mean, unless otherwise stated, a fluorine, chlorine, bromine, or iodine atom.

As used herein, the term "haloalkyl" group, and grammatical variants thereof, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyls include, but are not limited to, trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl," as used herein, and grammatical variants thereof, refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are positive integers and mean having any of a to b number of carbon atoms. For example, $(C_1\text{-}C_4)$hydrocarbyl means the hydrocarbyl group can be methyl $(C_1)$, ethyl $(C_2)$, propyl $(C_3)$, or butyl $(C_4)$, and $(C_0\text{-}C_b)$hydrocarbyl means in certain embodiments there is no hydrocarbyl group.

As used herein, the term "polymer," and grammatical variants thereof refers to a molecule having at least one repeating unit and can include copolymers; the term "copolymer," and grammatical variants thereof, refers to a polymer that includes at least two different repeating units. A copolymer can include any suitable number of repeating units.

As used herein, the term "derivative," and grammatical variants thereof, refers to any compound that is made from one of the listed compounds, for example, by replacing one atom in one of the listed compounds with another atom or group of atoms, ionizing one of the listed compounds, or creating a salt of one of the listed compounds.

As used herein, the term "isomer," and grammatical variants thereof, refers to two or more compounds having the same chemical formula but a different arrangement of atom within the particular molecule and different properties, whether functional or otherwise.

The term "high-solvency oil," and grammatical variants thereof, refers to a compound that is not or only minimally soluble in water, but itself capable of solubilizing aqueous insoluble organic or water dispersable organic compounds. The "high-solvency oil" described herein has a Kauri-butanol $(K_b)$ value of greater than about 40. The $K_b$ value is an international standardized measurement of solvent power governed by a standardized American Society for Testing and Materials (ASTM) method. The $K_b$ value refers to a volume in milliliters (mL) at 25° C. (77° F.) of a solvent, corrected to a defined standard governed by the ASTM, required to produce a defined degree of turbidity when added to 20 grams (g) of a standard solution of kauri resin in normal butyl alcohol. The $K_b$ value is a scaleless index. A higher $K_b$ value is characteristic of a solvent that is more efficient and aggressive in its ability to dissolve certain materials that have poor solubility in water or alkane/isoalkane oils.

The surfactant blend, regardless of its various components, may be added to a treatment fluid (e.g., a drilling treatment fluid, a stimulation (fracturing) treatment fluid, and the like) in an amount in the range of about 3.8754 liters per 1000 liters to about 1.8927 liters per 1000 liters of the treatment fluid (equivalent to about 1 gallon per 1000 gallons to about 5 gallons per 1000 gallons of the treatment fluid), encompassing any value and subset therebetween. The concentration is selected to aid in the recovery of both treatment and formation fluids to improve well production.

The surfactant blend includes at least a $C_8\text{-}C_{18}$ alcohol ethoxylate and a fatty acid alkanolamide. The $C_8\text{-}C_{18}$ alcohol ethoxylate may have the structure of $R^1$—O—$R^2$, where $R^1$ may be a substituted or unsubstituted $(C_8\text{-}C_{18})$hydrocarbyl and $R^2$ may be an ethyl, propyl, or —(CH$_2$—CH$_2$—O)$_p$—H in which p may be about 1 to about 30, encompassing any value and subset therebetween.

Examples of suitable commercially available alcohol ethoxylates for use as the $C_8\text{-}C_{18}$ alcohol ethoxylate for use in the surfactant blend of the present disclosure may include, but are not limited to, TERGITOL™ 15-S-7 Surfactant, available from Dow Chemical Company in Midland, Mich.; BIO-SOFT® N25-9, available from Stepan Company in Northfield, Ill.; and LUTENSOL® XL 90, LUTENSOL® A 9 N, and LUTENSOL® TDA 9, each available from BASF in Ludwigshafen, Germany.

The fatty acid alkanolamide may be a $(C_1\text{-}C_{50})$hydrocarbyl amide having groups $R^1$ and $R^2$ substituted on the amide nitrogen, wherein $R^1$ and $R^2$ can each be independently selected from the group consisting of —H, —$(C_1\text{-}C_{50})$hydrocarbyl, —(CH$_2$—CH$_2$—O)$_n$—H, —(CH$_2$—CH$_2$—CH$_2$—O)$_n$—H, and —$(C_1\text{-}C_{50})$hydrocarbylene-OH, wherein the —OH group can be substituted at any suitable position on the —$(C_1\text{-}C_{50})$hydrocarbylene group, such as a pendant secondary position or a terminal primary position, and wherein n may be an integer in the range of about 1 to about 50, encompassing any value and subset therebetween. The fatty acid alkanolamide for use in the surfactant blend surfactant may have the structure of Structure I:

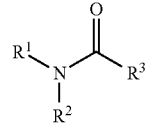

Structure I

The variable $R^3$ of Structure I may be the $(C_1\text{-}C_{50})$hydrocarbyl group. The fatty acid alkanolamide may be an alkanolamide of a tall oil fatty acid, coconut oil fatty acid, or a tallow fatty acid having the structure $R^3$—C(O)—OH (e.g., the fatty acid alkanolamide surfactant can have a structure identical to another alkanolamide that is actually derived from the corresponding fatty acid, but the alkanolamide surfactant need not be actually derived from the corresponding fatty acid). The $(C_1\text{-}C_{50})$hydrocarbyl groups and the —$(C_1\text{-}C_{50})$hydrocarbylene-OH group of the fatty acid alkanolamide may be unsubstituted. $R^3$ may be a substituted or unsubstituted $(C_{12}\text{-}C_{25})$hydrocarbyl or may be a substituted or unsubstituted $(C_{15}\text{-}C_{17})$hydrocarbyl. The fatty acid alkanolamide surfactant may be a tall oil $(C_{16}\text{-}C_{18})$fatty acid alkanolamide. Both of $R^1$ and $R^2$ of Structure I may be independently —$(C_1\text{-}C_{50})$hydrocarbylene-OH. One of $R^1$ and $R^2$ may be independently —$(C_1\text{-}C_{50})$hydrocarbylene-OH. The variables $R^1$ and $R^2$ may be independently selected from —H, substituted or unsubstituted $(C_1\text{-}C_{10})$hydrocarbyl, and substituted or unsubstituted —$(C_1\text{-}C_{10})$hydrocarbylene-OH. The variables $R_1$ and $R_2$ of Structure I may be independently selected from —H, —$(C_1\text{-}C_5)$alkyl, and —$(C_1\text{-}C_5)$alkylene-OH. The variables $R^1$ and $R^2$ may be each —CH$_2$—CH$_2$—OH.

In other embodiments, the variable $R^3$ of Structure I may be a substituted or unsubstituted $(C_{12}\text{-}C_{25})$hydrocarbyl or $(C_{15}\text{-}C_{17})$hydrocarbyl of a tall oil fatty acid having the structure $R^3$—C(O)—OH, and the variables $R^1$ and $R^2$ may each be —$(C_1\text{-}C_{10})$alkylene-OH or —CH$_2$—CH$_2$—OH.

The fatty acid alkanolamide may be a $(C_1\text{-}C_{50})$hydrocarbyl amide having groups $R^1$ and $R^2$ substituted on the amide nitrogen. The variables $R^1$ and $R^2$ may be each independently selected from the group consisting of —H and —(CH$_2$—CH$_2$—O)$_n$-$R^z$. At least one of $R^1$ and $R^2$ a,u be —(CH$_2$—CH$_2$—O)$_n$—H. At each occurrence, $R^z$ is selected from the group consisting of —H and $(C_1\text{-}C_{50})$hydrocarbyl. At each occurrence the $(C_1\text{-}C_{50})$hydrocarbyl is independently selected. The variable n may be an integer from about 1 to about 30, encompassing any value and subset therebetween. In some embodiments, the variables $R^1$ and $R^2$ may be each independently selected from the group consisting of —H and —$(CH_2—CH_2—O)_n$—H.

The fatty acid alkanolamide surfactant may be an ethoxylated ($C_{12}$-$C_{18}$)alkanolamide. The fatty acid alkanolamide surfactant may have the structure: $R^3$—C(O)—N($CH_2$—$CH_2$—O)$_2$, or a salt thereof. The variable $R^3$ may be a ($C_{11}$-$C_{13}$)hydrocarbyl group of a coconut oil fatty acid having the structure $R^3$—C(O)—OH. Herein, when a group is referred to as a corresponding group in a fatty acid, the group can have the same structure as the corresponding group, but the group need not be actually derived from the fatty acid.

The fatty acid alkanolamide may have the structure: $R^{3A}$—C(O)—N($CH_2$—$CH_2$—OH)$_2$, or a salt thereof, where the variable $R^{3A}$ may be a ($C_{15}$-$C_{17}$)hydrocarbyl of a tall oil fatty acid having the structure $R^{3A}$—C(O)—OH. In other embodiments, the fatty acid alkanolamide may have the structure: $R^{3B}$—C(O)—$N^+$($CH_2$—$CH_2$—OH)$_3$$X^-$, where the variable $R^{3B}$ can be a ($C_{15}$-$C_{17}$)hydrocarbyl of a tall oil fatty acid having the structure $R^{3B}$—C(O)—OH, and $X^-$ is a counterion. In still other embodiments, the fatty acid alkanolamide may the structure: $R^3$—C(O)—N($CH_2$—$CH_2$—OH)$_2$, or a salt thereof, where the variable $R^3$ may be a substituted or unsubstituted ($C_{15}$-$C_{17}$)hydrocarbyl of a tall oil fatty acid having the structure $R^3$—C(O)—OH; or may have the structure: $R^3$—C(O)—N($CH_2$—$CH_2$—OH)$_2$, or a salt thereof, where the variable $R^3$ can be a ($C_9$-$C_{19}$)hydrocarbyl of a coconut oil fatty acid having the structure $R^3$—C(O)—OH; or may have the structure: $CH_3(CH_2)_{10}$—C(O)—N($CH_2$—$CH_2$—OH)$_2$, or a salt thereof.

In certain embodiments, the fatty acid alkanolamide may include a dialkanomide, such as diethanolamine, a trialkanolamine such as triethanolamine, or a combination thereof.

The fatty add alkanolamide may have the structure: $R^3$—C(O)—N($CH_2$—$CH_2$—OH)$_2$, or a salt thereof, where the variable $R^3$ can be a ($C_9$-$C_{19}$)hydrocarbyl of a coconut oil fatty acid having the structure $R^3$—C(O)—OH; or may have the structure: $R^3$—C(O)—NH($CH_2$—$CH_2$—O)$_6$—H, or a salt thereof, where the variable $R^3$ can be a ($C_9$-$C_{19}$) hydrocarbyl of a coconut oil fatty acid having the structure $R^3$—C(O)—OH.

Examples of suitable commercially available fatty acid alkanolamides for use in the surfactant blends of the present disclosure include, but are not limited to AMADOL® surfactants including 1017, 511, 5133, 5195, each available from AzkoNobel in Amsterdam, Netherlands; or NINOL® surfactants including 49-CE and C-d, each available from Stepan Company in Northfield, Ill.

In some embodiments, the ratio of the $C_8$-$C_{18}$ alcohol ethoxylate to the fatty acid alkanolamide in the surfactant blend of the flowback aid composition is in the range of from about 5:1 to about 1:1, encompassing any value and subset therebetween.

In some embodiments, optionally, the surfactant blend may further comprise a surfactant selected from the group consisting of a non-ionic surfactant, an anionic surfactant, a cationic surfactant, an amphoteric surfactant, and any combination thereof. The anionic surfactant, cationic surfactant, and amphoteric surfactant may be collectively referred to as "ionic" surfactants herein.

The surfactant blend may include one ionic surfactant, more than more ionic surfactant, or can be substantially free of ionic surfactants. The surfactant blend may include one non-ionic surfactant, more than one non-ionic surfactant, or may be substantially free of non-ionic surfactants. The one or more ionic surfactants, one or more non-ionic surfactants, or a combination thereof, may form any suitable proportion of the surfactant blend, such as about 1% to about 25% by weight of the surfactant blend, encompassing any value and subset therebetween. In certain embodiments, the ionic surfactant, non-ionic surfactant, or a combination thereof may provide improved performance, such as improved demulsification performance, as compared to a corresponding surfactant blend that lacks the ionic surfactant, non-ionic surfactant, or a combination thereof. The ionic surfactant, non-ionic surfactant, or combination thereof, may be varied to "tune" the surfactant blend to exhibit desired properties in a particular subterranean formation.

Examples of suitable ionic surfactants, non-ionic surfactants, or combinations thereof include, but are not limited to, an alkylamine alkoxylate surfactant, alkylamine ethoxylate surfactant, an alcohol alkoxylate surfactant, an alcohol ethoxylate surfactant, a fatty acid alkoxylate surfactant, a fatty acid ethoxylate surfactant, an alkyl glycoside surfactant, an amine-oxide surfactant, an anionic surfactant, a cationic surfactant, a zwitterionic surfactant, an amphoteric surfactant, an amphiphilic surfactant, and any combination thereof (e.g., a chemically compatible combination thereof). The ionic surfactant, non-ionic surfactant, or combination thereof may include, but are not limited to, ethoxylated tall oil; ethoxylated ($C_{10}$-$C_{18}$)fatty acid esters; ethoxylated ($C_{12}$-$C_{18}$)alkylamines; ethoxylated diamines; dodecylsulfate salts; dodecylbenzene sulfonate salts; alkane, xylene, cumene, or toluene sulfonate salts; alkylamidopropyl betaines; alkylamidopropyl hydroxysultaines; ($C_{12}$-$C_{16}$) alpha olefin sulfonate salts; linear or branched alkyl diphenyl oxide disulfonate salts; dialkylsulfosuccinate salts; benzyldimethylalkylammonium chloride; ($C_{10}$-$C_{18}$)amine oxides; ($C_{12}$-$C_{18}$)alkylamidopropyl amine oxides; or a combination thereof. The ionic surfactant or non-ionic surfactant may be any suitable embodiment of the alkanolamide or alkoxylated alcohol surfactants described herein.

The ionic surfactant, non-ionic surfactant, or combination thereof may be an alkylamine ethoxylate, such as any suitable alkylamine ethoxylate. The alkylamine ethoxylate may have the structure: $R^6$—$CH_2$—$NR^7R^8$, or a salt thereof, where $R^6$ may be a substituted or unsubstituted ($C_5$-$C_{50}$) hydrocarbyl group of a fatty acid having the structure $R^6$—C(O)—OH; $R^7$ and $R^8$ may each independently be selected from the group consisting of —H and —($CH_2$—$CH_2$—O)$_p$—H in which p may be an integer of about 1 to about 30, encompassing any value and subset therebetween.

The alkylamine ethoxylate may have the structure: $R^6$—$CH_2$—N($CH_2$—$CH_2$—OH)$_2$, or a salt thereof. The variable $R^6$ may be a ($C_9$-$C_{19}$)hydrocarbyl group of a coconut oil fatty acid having the structure: $R^6$—C(O)—OH.

In some embodiments, the alkylamine ethoxylate may have the structure: $R^6$—$CH_2$—N((—$CH_2$—$CH_2$—O)$_{n1}$—H)((—$CH_2$—$CH_2$—O)$_{n2}$—H), or a salt thereof. The variable $R^6$ may be a ($C_9$-$C_{19}$)hydrocarbyl group of a coconut oil fatty acid having the structure: $R^6$—C(O)—OH, where n1 and n2 may be at least 1, and n1+n2 may be about 15. In other embodiments, the alkylamine ethoxylate may have the structure: $R^6$—$CH_2$—N(($CH_2$—$CH_2$—O)$_{n1}$—H)((—$CH_2$—$CH_2$—O)$_{n2}$—H), or a salt thereof. The variable $R^6$ may be a ($C_9$-$C_{19}$)hydrocarbyl group of a coconut oil fatty acid having the structure: $R^6$—C(O)—OH, where n1 and n2 may be at least 1, and n1+n2 may be about 5.

In some embodiments, the alkylamine ethoxylate may have the structure: $R^6—CH_2—N((—CH_2—CH_2—O)_{n1}—H)((—CH_2—CH_2—O)_{n2}—H)$, or a salt thereof. The variable $R_6$ may be a $(C_{13}-C_{17})$hydrocarbyl of a tallow oil fatty acid having the structure: $R^6—C(O)—OH$, n1 and n2 may be at least 1, and n1+n2 may be about 5. In some embodiments, the alkylamine ethoxylate may have the structure: $R^6—CH_2—N((—CH_2—CH_2—O)_{n1}—H)((—CH_2—CH_2—O)_{n2}—H)$, or a salt thereof. The variable $R_6$ may be a $(C_{13}-C_{17})$hydrocarbyl of a tallow oil fatty acid having the structure: $R^6—C(O)—OH$, n1 and n2 may be at least 1, and n1+n2 may be about 15.

In some embodiments, the ionic surfactant, non-ionic surfactant, or combination thereof may be a fatty acid ethoxylate, such as any suitable fatty acid ethoxylate. The fatty acid ethoxylate may have the structure: $R^{10}—C(O)—O(CH_2—CH_2—O)_q—H$, or a salt thereof, where the variable $R^{10}$ may be a substituted or unsubstituted $(C_5-C_{20})$ hydrocarbyl of a fatty acid having the structure: $R^{10}—C(O)—OH$, and q may be about 1 to about 50, encompassing any value and subset therebetween. In other embodiments, the fatty acid ethoxylate may have the structure: $R^{10}—C(O)—O(CH_2—CH_2—O)_3—H$, or a salt thereof, where the variable $R^{10}$ may be a substituted or unsubstituted $(C_{15}-C_{17})$ hydrocarbyl of a tall oil fatty acid having the structure $R^{10}—C(O)—OH$. In other embodiments, the fatty acid ethoxylate may have the structure: $R^{10}—C(O)—O(CH_2—CH_2—O)_{15}—H$, or a salt thereof, where the variable $R^{10}$ may be a substituted or unsubstituted $(C_{15}-C_{17})$hydrocarbyl of a tall oil fatty acid having the structure: $R^{10}—C(O)—OH$. In still other embodiments, the fatty acid ethoxylate may have the structure: $R^{10}—C(O)—O(CH_2—CH_2—O)_{30}—H$, or a salt thereof, where the variable $R^{10}$ may be a substituted or unsubstituted $(C_{15}-C_{17})$hydrocarbyl of a tall oil fatty acid having the structure: $R^{10}—C(O)—OH$.

In some embodiments, the ionic surfactant, non-ionic surfactant, or combination thereof may be an alkyl glycoside, such as any suitable alkyl glycoside. The alkyl glycoside may be a substituted or unsubstituted $(C_5-C_{50})$alkyl group having a monomeric, oligomeric, or polymeric saccharide bound thereto via a glycosidic bond on one of the saccharide units. For example, the alkyl glycoside may have the following Structure II:

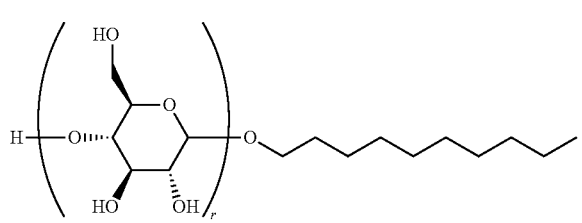

Structure II

The variable r of Structure II may be about 1 to about 100, encompassing any value and subset therebetween. In some embodiments, the variable r of Structure II has an average of about 1-2 (e.g., about 1.5, or about 1.6).

In other embodiments, the alkyl glycoside may have the following Structure III:

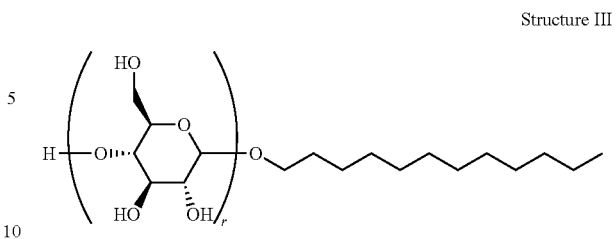

Structure III

The variable r of Structure III may be about 1 to about 100, encompassing any value and subset therebetween. In some embodiments, the variable r of Structure III has an average of about 1-2 (e.g., about 1.4).

In some embodiments, the ionic or non-ionic surfactant included in the surfactant blend may be an amine-oxide surfactant, such as any suitable amine-oxide surfactant. The amine-oxide surfactant may have the following Structure IV or Structure V:

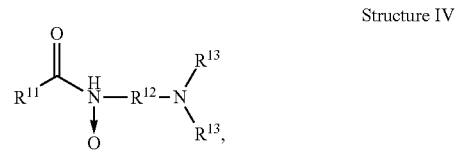

Structure IV

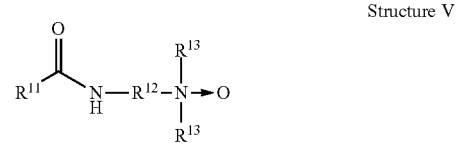

Structure V

The variable $R^{11}$ may be a substituted or unsubstituted $(C_1-C_{50})$hydrocarbyl, or a substituted or unsubstituted $(C_5-C_{30})$hydrocarbyl, or a substituted or unsubstituted $(C_{11}-C_{13})$ alkyl. The variable $R^{12}$ may be a substituted or unsubstituted (C1-C20)hydrocarbylene, or a substituted or unsubstituted $(C_1-C_{10})$hydrocarbylene, or a substituted or unsubstituted $(C_1-C_5)$alkylene. In some embodiments, the variable $R^{12}$ is propylene. At each occurrence, $R^{13}$ may be independently a substituted or unsubstituted $(C_1-C_{20})$hydrocarbyl, a substituted or unsubstituted $(C_1-C_5)$alkyl. In some embodiments, the variable $R^{13}$ is methyl.

In yet other embodiments, the amine-oxide surfactant(s) for use in the surfactant blend of the present disclosure may have the following Structures VI-VIII:

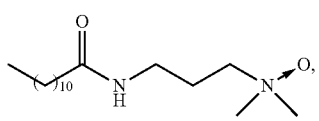

Structure VI

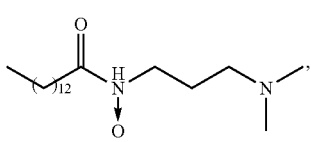

Structure VII

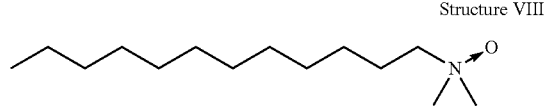

Structure VIII

A combination of the amine-oxide surfactants of Structure VI, Structure VII, and Structure VIII may further be included in the surfactant blend, including any other combination of surfactants, without departing from the scope of the present disclosure.

In some embodiments, the amine-oxide surfactant may have the following Structure IX:

Structure IX

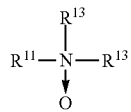

The variable $R^{11}$ may be a substituted or unsubstituted $(C_1-C_{50})$hydrocarbyl, and at each occurrence, $R^{13}$ may be independently a substituted or unsubstituted $(C_1-C_{20})$hydrocarbyl.

The ionic surfactant for optional use in the surfactant blend of the present disclosure may be an anionic surfactant, such as any suitable anionic surfactant, such as a sulfonate or a disulfonate. In some embodiments, the anionic surfactant may have the following Structure X:

Structure X

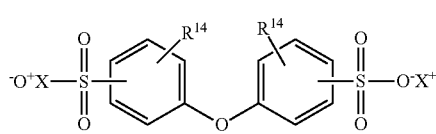

Independently on each phenyl ring, the variable $R^{14}$ may be a substituted or unsubstituted $(C_5-C_{50})$hydrocarbyl, and $X^-$ is a counter-ion.

In other embodiments, a suitable anionic surfactant may have the following Structure XI:

Structure XI

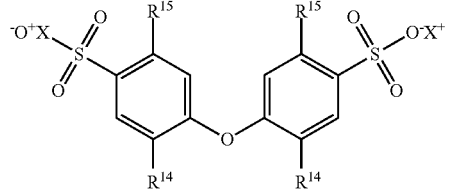

Independently on each phenyl ring, one of $R^{14}$ and $R^{15}$ may be —H and the other may be a linear or branched $(C_{12})$alkyl group, and X— is a counter-ion.

In certain embodiments, the anionic surfactant for option use in the surfactant blend described herein may have an alkyl or branched alkyl pendent chain on a benzene ring structure with a corresponding sulfonate group that is ortho, meta, or para. In some embodiments, the anionic surfactant for option use in the surfactant blend described herein may have the following Structure XII, where X— is a counter-ion:

Structure XII

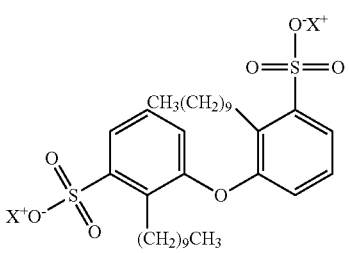

In some embodiments, the anionic surfactant may have the structure: $(C_5-C_{50})$hydrocarbyl-L-OS(O)(O)O$^-$X$^+$ or $(C_5-C_{50})$hydrocarbyl-L-S(O)(O)O$^-$X$^+$, where the $(C_5-C_{50})$ hydrocarbyl may be substituted or unsubstituted, and $X^+$ is a counter-ion. The "L" variable described may be selected from the group consisting of a bond and —(O—CH$_2$—CH$_2$)n-, wherein n is an integer of from about 1 to about 100, encompassing any value and subset therebetween. In other embodiments, the anionic surfactant may have the structure: CH$_3$—(CH$_2$)$_{11}$—OS(O)(O)O$^-$N$^+$(CH$_2$CH$_2$OH)$_3$ or CH$_3$—(CH$_2$)$_{10}$—OS(O)(O)O$^-$X$^+$, where X$^+$ is a counter-ion. In yet other embodiments, the anionic surfactant may be dodecylbenzenesulfonate, triethanolamine, having the structure: CH$_3$—(CH$_2$)$_{11}$-(para-substituted phenyl)-S(O)(O)O$^-$N$^+$(CH$_2$CH$_2$OH)$_3$H.

In some instances, the ionic surfactant may be a cationic surfactant, such as any suitable cationic surfactant. The cationic surfactant may be a quaternary ammonium salt, wherein the ammonium nitrogen atom may be substituted by four substituents each independently selected from the group consisting of —H and a substituted or unsubstituted —(C$_1$-C$_{50}$)hydrocarbyl. In an embodiment, the cationic surfactant may have the following Structure XIII:

Structure XIII

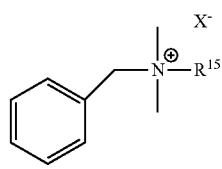

The variable $R^{15}$ may be a substituted or unsubstituted $(C_5-C_{50})$hydrocarbyl and $X^-$ is a counter-ion.

In some instances, the ionic surfactant is an amphoteric surfactant (encompassing zwitterionic surfactants), such as any suitable amphoteric surfactant. The amphoteric surfactant may, in some embodiments, have the structure: $R^{16}$—C(O)—NH—(R$^{17}$)—N$^+$((C$_1$-C$_5$)alkyl)$_2$-(R$^{17}$)—S(O)(O)—O$^-$, where the variable $R^{16}$ may be a substituted or unsubstituted $(C_5-C_{50})$hydrocarbyl group of a fatty acid having the structure: $R^{16}$—C(O)—OH, and at each occurrence, the variable $R^{17}$ may be independently chosen from a bond and a substituted or unsubstituted $(C_1-C_{50})$hydrocarbylene group.

In an embodiment, the amphoteric surfactant may have the following Structure XIV:

Structure XIV

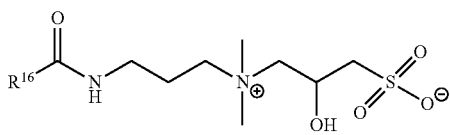

The variable $R^{16}$ may be a $(C_9\text{-}C_{19})$hydrocarbyl group of a coconut oil fatty acid having the structure: $R^{16}$—C(O)—OH.

Examples of commercially available suitable ionic and non-ionic surfactants include, but are not limited to, those available from AzkoNobel in Amsterdam, Netherlands: ETHOMEEN® C/12, a tertiary amine ethoxylate surfactant; ETHOMEEN® C/25, a tertiary amine ethoxylate surfactant; ETHOMEEN® C/25A, a tertiary amine ethoxylate surfactant; ETHOMEEN® T/15, a tallow amine ethoxylate surfactant; ETHOMEEN® T/25, a tallow amine ethoxylate surfactant; Ethomid® HT/23, an ethoxylated hydrogenated tallow amide surfactant. Additional commercially available suitable ionic and non-ionic surfactants include, but are not limited to, those available from Dow Chemical Company in Midland, Mich.: ECOSURF™ SA-9, a non-ionic seed oil surfactant; DOWFAX™ 2A1, a diphenyl oxide derived surfactant; DOWFAX™ 3B2, a diphenyl oxide derived surfactant; DOWFAX™ C10L, a diphenyl oxide derived surfactant. Still further suitable commercially available ionic and non-ionic surfactants include, but are not limited to, those available from Stepan Company in Northfield, Ill.: NINEX® MT-603, an ethoxylated fatty acid derivative surfactant; NINEX® MT-615, an ethoxylated fatty acid derivative surfactant; NINEX® MT-630F, an ethoxylated fatty acid derivative surfactant; AMMONYX® LMDO, an amido amine type of amine oxide surfactant; AMMONYX® LO, a lauramine oxide surfactant; AMPHOSOL® CS-50, a tertiary amine derived surfactant; STEPANOL® WAT-K, a triethanolamine lauryl sulfate surfactant; STEPANOL® ME-DRY, a sodium lauryl sulfate surfactant; BIO-SOFT® N-300, a triethanolamine linear alkylate sulfonate surfactant. Suitable commercially available ionic and non-ionic surfactants for use in the surfactant blend further include, but are not limited to, those available from BASF in Ludwigshafen, Germany: AGNIQUE® PG 8105, a $C_8\text{-}C_{10}$ alkyl polyglycoside surfactant; GLUCOPON® 425 N, an alkyl polyglycoside surfactant; GLUCOPON® 600 UP, a $C_{10}\text{-}C_{16}$ alkyl polyglycoside surfactant. An additional suitable commercially available cationic surfactant for use in the surfactant blend of the present disclosure may include, but is not limited to, 19N™ cationic surfactant, available from Halliburton Energy Services, Inc. in Houston, Tex.

As provided above, the at least one demulsifier is included in the flowback aid composition of the present disclosure and may comprise one or more of at least a desalter agent to separate water from crude oil, a treater agent to flocculate submicron particles from crude oil, and any combination thereof. The desalter agent may be any suitable compound capable of providing the desalter agent function and that is compatible with the other components of the flowback aid composition for use in a subterranean formation operation. Likewise, the treater agent may be any suitable compound capable of providing the treater agent function and that is compatible with the other components of the flowback aid composition for use in a subterranean formation operation.

In some embodiments, the desalter agent may be present in an amount of from about 0.5% to about 20% by weight of the flowback aid composition, encompassing any value and subset therebetween. In some embodiments, the treater agent may be present in an amount of from about 0.5% to about 20% by weight of the flowback aid composition, encompassing any value and subset therebetween.

In certain embodiments, the desalter agents described herein may include, but are not limited to, a polyalkylene oxide polyol, a polyether polyol, a dedridic polyalkylene oxide polyol, and the like, and any combination thereof. Such desalter agents exhibit rapid water separation and are able to separate water from crude oils of various origins, allowing wide geographical use. Examples of specific desalter agents for use in the embodiments described herein may include, but are not limited to, and as described below, a glycerin alkoxylate, a trimethylolpropane (TMP) alkoxylate, an ethylene oxide/propylene oxide (EO/PO) block copolymer, a tetrol EO/PO block copolymer, and any combination thereof.

In some embodiments, the desalter agent alone or in combination with other demulsifiers (e.g., desalter agents, treater agents, dropper agents (described below), and the like, and any combination thereof) may be a glycerine alkoxylate having the following Structure XV:

Structure XV

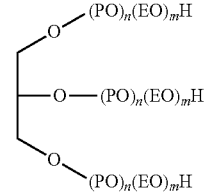

The variable $(PO)_n$ represents moles of propylene oxide and the variable $(EO)_m$ represents moles of ethylene oxide. The variable n may be an integer of from about 1 to about 15, encompassing any value and subset therebetween. The variable m may be an integer of from about 1 to about 15, encompassing any value and subset therebetween.

In some embodiments, the desalter agent alone or in combination with other demulsifiers for use in the flowback aid composition of the present disclosure may be a TMP alkoxylate having the following structure XVI:

Structure XVI

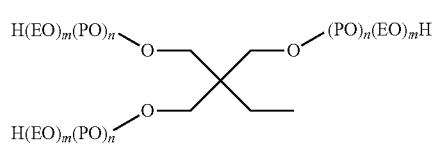

The variable $(PO)_n$ represents moles of propylene oxide and the variable $(EO)_m$ represents moles of ethylene oxide. The variable n may be an integer of from about 1 to about 15, encompassing any value and subset therebetween. The variable m may be an integer of from about 1 to about 15, encompassing any value and subset therebetween.

The desalter agent, in some embodiments, alone or in combination with other demulsifiers in the flowback aid composition described herein may be an EO/PO block copolymer having the following Structure XVII:

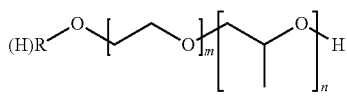

Structure XVII

The variable R may be H, $C_1$, $C_2$, $C_3$, $C_4$, or $C_6$; the variable m may be an integer of from about 1 to about 20, encompassing any value and subset therebetween; and the variable n may be an integer of from about 1 to about 20, encompassing any value and subset therebetween.

The demulsifier of the flowback aid composition described herein may comprise a desalter agent alone or in combination with a treater agent, among other potential demulsifiers (e.g., dropper agents), without departing from the scope of the present disclosure. In some embodiments, the treater agent may include, but is not limited to, a polyethyleneimine (PEI) alkoxylate, an ethylenediamine (EDA) alkoxylate, and any combination thereof.

In certain embodiments, the treater agent alone or in combination with other demulsifiers in the flowback aid composition is a PEI alkoxylate having the following Structure XVIII:

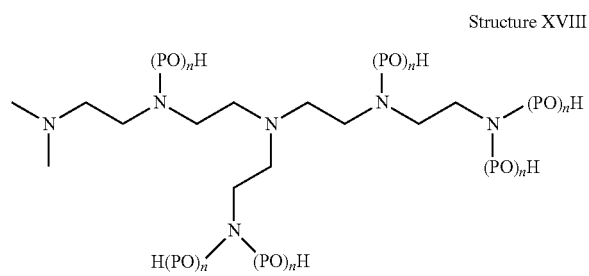

Structure XVIII

The variable $(PO)_n$ represents moles of propylene oxide and the variable n may be an integer of from about 1 to about 10, encompassing any value and subset therebetween.

In other embodiments, the treater agent alone or in combination with other demulsifiers for use in the flowback aid composition may be an EDA alkoxylate having the following Structure XIX:

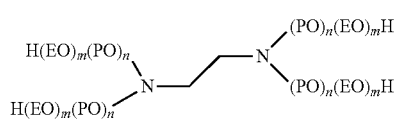

Structure XIX

The variable $(PO)_n$ represents moles of propylene oxide and the variable $(EO)_m$ represents moles of ethylene oxide. The variable n may be an integer of from about 1 to about 10, encompassing any value and subset therebetween. The variable m may be an integer of from about 1 to about 10, encompassing any value and subset therebetween.

In some embodiments, the flowback aid composition may additionally comprise a dropper agent, which may be a form of demulsifier. As used herein, the term "dropper agent," and grammatical variants thereof, refers to a compound capable of coalescing and releasing free water. Examples of suitable dropper agents may include, but are not limited to, alkyloxylated alkylphenol resins (e.g., alkyl-substituted phenols having a monoethoxy or polyethoxy group on the hydroxy group of the phenol), such as ethoxylated alkylphenol resins.

In some embodiments, the dropper agent may be present in an amount of from about 5% to about 40% by weight of the flowback aid composition, encompassing any value and subset therebetween.

An example of a suitable alkoxylated alkylphenol resin (e.g., ethoxylated alkylphenol resin) may be prepared according to Structure XX:

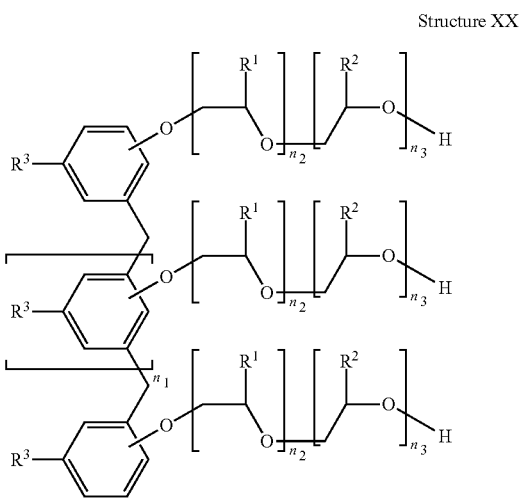

Structure XX

The variables $R^1$ and $R^2$ may be independently selected from the group consisting of H and $(C_1-C_{12})$alkyl (e.g., a methyl group); $R^3$ may be a linear or branched $(C_1-C_{40})$alkyl; n1 is an integer from 1 to about 30, encompassing any value and subset therebetween; n2 is an integer from 1 to about 12, encompassing any value and subset therebetween; and n3 is an integer from 0 to about 12, encompassing any value and subset therebetween.

In some embodiments, the dropper agent is an alkoxylated butyl-, amyl-, or nonyl- phenol resin, and the like, without departing from the scope of the present disclosure. Moreover, the dropper agent may be ethoxylated, methoxylated, butoxylated, pentoxylated, or hexoxylated alkylphenol resins, and the like, without departing from the scope of the present disclosure.

The dropper agents according to Structure VX reflect variable points of substitution on the terminal phenyl rings (i.e., alkoxy chains are attached variously to ortho, meta, and para positions). In some embodiments, dropper agents of Structure VX reflect only para substitution, as shown above.

Examples of suitable commercially available desalter agents, treater agents, and dropper agents include all compounds under the tradename BASOROL® (and listed in the Examples below), available from BASF in Ludwigshafen, Germany. An example of a suitable commercially available dropper agent may include, but is not limited to the alkoxylated alkylphenol resin CLEARBREAK® 8967 Surfactant, available from Solvay in Brussels, Belgium.

In some embodiments, the flowback aid composition described herein may further comprise a flowback additive including, but not limited to, a $C_8-C_{13}$ isoalcohol, an aqueous-soluble co-solvent, a co-surfactant (e.g., a low molecular weight alcohol), and any combination thereof. [I combined the aqueous-soluble The $C_8-C_{13}$ isoalcohol flowback additive may be included in the flowback aid composition of the present disclosure to enhance the efficacy of the one or more demulsifiers therein to aid in breaking emulsions and separating water from oil (e.g., water-in-oil emulsions in crude oil). In some instances, the $C_8$-$C_{13}$ isoalcohols include isooctyl alcohol ($C_8H_{18}O$), isononyl alcohol ($C_9H_{20}O$), isodecyl alcohol ($C_{10}H_{22}O$), isoundecyl alcohol ($C_{11}H_{24}O$), isododecyl alcohol (C12H$_{26}$O), isotridecyl alcohol ($C_{13}H_{28}O$) (e.g., EXXAL™ 13 Surfactant, available from ExxonMobil Chemical in Irving, Tex.), any isomers thereof, any derivatives thereof, and any combination thereof. Any other $C_8$-$C_{13}$ isoalcohols (e.g., unsaturated, isomers, derivatives, and the like) are also suitable for use as a flowback additive, without departing from the scope of the present disclosure.

The aqueous-soluble co-solvent flowback additive may be included in the flowback aid composition described herein to serve as a "winterization agent" by lowering (or decreasing) the pour and freeze point of the particular flowback aid composition, which may permit the use of the flowback aid composition in subterranean formations having or being exposed to reduced temperatures. Such aqueous-soluble co-solvents may include, but are not limited to, methanol, ethanol, isopropanol, propanol, butanol, pentanol, any isomers thereof, any derivatives thereof, and the like, and any combination thereof.

The co-surfactant flowback additive may overlap with one or more of the aqueous-soluble co-solvents and additionally provide functionality as a co-surfactant for solubilizing the high-solvency oil (which included) in the flowback aid composition emulsion formed, whether mesophase, microemulsion, or nanoemulsion. In some embodiments, suitable co-surfactant flowback additives are low molecular weight alcohols, having a molecular weight of less than about 100 grams per mole (g/mol). In some embodiments, suitable co-surfactant flowback additives include, but are not limited to, 1-butanol, 2-butanol, cyclobutanol, 1-pentanol, 2-pentanol, 3-methyl-2-butanol, 2-methyl-1-butanol, any isomers thereof, any derivatives thereof, and the like, and any combination thereof. Any other $C_4$-$C_5$ isoalcohols (e.g., unsaturated, isomers, derivatives, and the like) are also suitable for use as a flowback additive, without departing from the scope of the present disclosure.

In some embodiments, the flowback aid composition further comprises an oil phase of a high-solvency oil. In some embodiments, the high-solvency oil is derived from natural plant oil, as shown below. Depending on the amount and type of high-solvency oil, the flowback aid composition may be a mesophase, a microemulsion, or a nanoemuslion. Typically, the mesophase is no longer maintained upon addition of a concentration of high-solvency oil greater than or equal to 2% by weight of the flowback aid composition. Upon increasing the composition of the high-solvency oil to greater or equal to 2% to about 40% by weight of the flowback aid composition, encompassing any value and subset therebetween, the flowback aid composition may take the form of a microemulsion or a nanoemulsion, as described above. The tendency to form either a microemulsion or nanoemulsion will depend on the amount and type of high-solvency oil included to form the oil phase, as well as the other components forming the flowback aid composition.

In some embodiments, the high-solvency oil has the following Structure XXI:

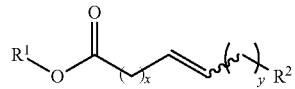

Structure XXI

The variable $R^1$ may be a $C_1$-$C_8$(alkyl); $R^2$ may be independently selected from the group consisting of H and ($C_1$-$C_8$)alkyl; the variable x may be an integer between 1 and 20 inclusive, encompassing any value and subset therein; and the variable y may be an integer between 0 and 20 inclusive, encompassing any value and subset therein.

In various embodiments, in Structure XXI, $R^1$ is $C_1$-$C_4$ (alkyl); $R^2$ is H; x is an integer from 5 to 8 inclusive; and y is an integer from 0 to 3 inclusive. Exemplary commercially available compounds of Structure XXI are sold as ELEVANCE CLEAN® products, available from Elevance Renewable Sciences, Inc. in Woodridge, Ill. An example of such a commercially available compound includes ELEVANCE CLEAN® 1000 having the following structure:

ELEVANCE CLEAN® 1000

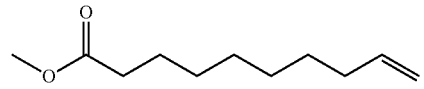

Another example of such a commercially available compound includes ELEVANCE CLEAN® 1200HT having the following structure:

ELEVANCE CLEAN® 1200HT

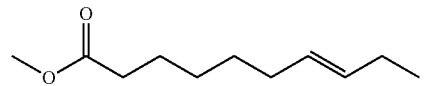

In another embodiments, alone or in combination with Structure XXI when the flowback aid composition comprises an oil phase of a high-solvency oil, the high-solvency oil may have the following Structure XXII:

Structure XXII

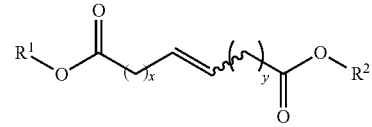

The variable $R^1$ may be a $C_1$-$C_{14}$(alkyl) or $C_1$-$C_{14}$(aryl); $R^2$ may be a $C_1$-$C_{14}$(alkyl) or $C_1$-$C_{14}$(aryl); the variable x may be an integer between 1 and 20 inclusive, encompassing any value and subset therein; and the variable y may be an integer between 0 and 20 inclusive, encompassing any value and subset therein. In some embodiments, x and y of Structure XXII are each independently integers between 2 and 10, encompassing any value and subset therebetween.

The high-solvency oil may accordingly be methyl 9-decenoate, methyl 9-dodecenoate, a high-solvency heteroatom containing oil, and the like, and any combination thereof. The high-solvency oil may facilitate the routine and universal formulation of a particular desired emulsion type, as described above. The high-solvency oils described herein accordingly exhibit high solvency power, both as measured by Hansen solubility parameters and Kauri-butanol, $K_b$, value, but are not typical high solvency hydrocarbon solvents, such as aromatic oils, terpene, or terpenoid-based oils, and the like.

The flowback aid composition may include any suitable additional component in any suitable proportion, such that the surfactant blend or flowback aid composition including the same may be used as described herein. Any component listed herein and not explicitly required as a base formulation of the flowback aid composition as described herein may be present or not present in the flowback aid composition, without departing from the scope of the present disclosure.

In some embodiments, the flowback aid composition may include one or more viscosifiers. The viscosifier may be any suitable viscosifier that is compatible with the components of the flowback aid composition. The viscosifier may affect the viscosity of the flowback aid composition or a solvent or co-solvent that contacts the flowback aid composition at any suitable time and location. In some embodiments, the viscosifier provides an increased viscosity at least one of before introduction of the flowback aid composition into a subterranean formation, at the time of introduction into the subterranean formation, during travel through a tubular disposed in the subterranean formation (e.g., in a wellbore), once the flowback aid composition reaches a particular subterranean location, or some period of time after the flowback aid composition reaches a particular subterranean location. In some embodiments, the viscosifier may be present in an amount of from about 0.0001% to about 10% by weight of the flowback aid composition, encompassing any value and subset therebetween (e.g., about 0.004% to about 0.1%).

The viscosifier may include at least one of a substituted or unsubstituted polysaccharide, and/or a substituted or unsubstituted polyalkene (e.g., a polyethylene, wherein the ethylene unit is substituted or unsubstituted, derived from the corresponding substituted or unsubstituted ethene), wherein the polysaccharide and/or polyalkene is crosslinked or uncrosslinked. The viscosifier may include a polymer having at least one repeating unit derived from a monomer selected from the group consisting of ethylene glycol, acrylamide, vinyl acetate, 2-acrylamidomethylpropane sulfonic acid or its salts, trimethylammoniummethyl acrylate halide, trimethylammoniummethyl methacrylate halide, and any combination thereof. The viscosifier may include a crosslinked gel or a crosslinkable gel. The viscosifier may include at least one of a linear polysaccharide, and a poly($(C_2-C_{10})$alkene), wherein the $(C_2-C_{10})$alkene is substituted or unsubstituted. The viscosifier may include at least one of poly (acrylic acid) or $(C_1-C_5)$alkyl esters thereof, poly (methacrylic acid) or $(C_1-C_5)$alkyl esters thereof, poly(vinyl acetate), poly(vinyl alcohol), poly(ethylene glycol), poly (vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, derivatized cellulose (e.g., carboxymethyl cellulose, hydroxyethyl cellulose, carboxymethyl hydroxyethyl cellulose, hydroxypropyl cellulose, or methyl hydroxy ethyl cellulose), and any combination thereof.

In some embodiments, the viscosifier may include at least one (or any combination of two or more) of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier may include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier may include a poly (vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, a substituted or unsubstituted $(C_1-C_{20})$alkyl ester thereof. The viscosifier may include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$ alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen-containing substituted or unsubstituted $(C_1-C_{10})$heterocycle. The viscosifier may include a poly (vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier may include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and any ion thereof. The viscosifier may include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the flowback aid composition may include one or more crosslinkers. The crosslinker may be any suitable crosslinker compatible with the various components of the flowback aid composition. In some examples, the crosslinker may be incorporated in a cross-linked viscosifier, and in other examples, the crosslinker can crosslink a crosslinkable material (e.g., downhole). The crosslinker may include at least one of chromium, aluminum, antimony, zirconium, titanium, calcium, boron, iron, silicon, copper, zinc, magnesium, and any ion thereof. The crosslinker may include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker may be a $(C_1-C_{20})$alkylenebiacrylamide (e.g., methylenebisacrylamide), a poly(($(C_1-C_{20})$alkenyl)-substituted mono- or poly-$(C_1-C_{20})$ alkyl ether (e.g., pentaerythritol allyl ether), and a poly($C_2-C_{20}$)alkenylbenzene (e.g., divinylbenzene). In some embodiments, the crosslinker may be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. In some embodiments, the crosslinker may be present in an amount of from about 0.00001% to about 5% by weight of the flowback aid composition, encompassing any value and subset therebetween (e.g., about 0.001% to about 0.01%).

In some embodiments, the flowback aid composition may include one or more breakers. The breaker may be any suitable breaker compatible with the various components of the flowback aid composition, and such that the surrounding fluid (e.g., a treatment fluid, such as a drilling or fracturing fluid) may be at least partially broken for more complete and more efficient recovery thereof, such as at the conclusion of the hydraulic fracturing treatment. In some embodiments, the breaker may be encapsulated or otherwise formulated to give a delayed-release or a time-release of the breaker, such that the surrounding fluid can remain viscous for a suitable amount of time prior to breaking. The breaker can be any suitable breaker; for example, the breaker may be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker may be an oxidative breaker or an enzymatic breaker. An oxidative breaker may be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker may be at least one of an alpha or beta amylase, amyloglucosidase, oligoglucosidase, invertase, maltase, cellulase, hemi-cellulase, and mannanohydrolase. In some embodiments, the breaker may be present in an amount of from about 0.001% to about 30% by weight of the flowback aid composition, encompassing any value and subset therebetween (e.g., about 0.01% to about 5%).

The aqueous base fluid and the high solvency fluid have been described above, however, other suitable fluids may be included in the flowback aid composition in the aqueous phase or the oil phase thereof provided that it does not interfere with the performance of the flowback aid composition described herein. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like), a mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, sea water, and a downhole fluid.

A downhole fluid may become incorporated in the flowback aid composition, without departing from the scope of the present disclosure and may be present in either the aqueous phase (e.g., separated water) or the oil phase, depending on the composition of the downhole fluid. For example, the flowback aid composition may be combined with any suitable downhole fluid before, during, or after introduction of the flowback aid composition in a subterranean formation or upon contacting the flowback aid composition with subterranean material. In some examples, the flowback aid composition may be combined with a downhole fluid above the surface, and then the combined composition is placed in a subterranean formation or contacted with a subterranean material. In another example, the flowback aid composition may be introduced into a subterranean formation to combine with a downhole fluid, and the combined composition is contacted with a subterranean material or is considered to be placed in the subterranean formation. The placement of the flowback aid composition in the subterranean formation may include contacting subterranean material.

In some embodiments, the flowback aid composition may include any suitable amount of any suitable additional materials used in a downhole treatment fluid for use in a subterranean formation operation. For example, the flowback aid composition may include proppant, acid, alcohol or polyol, cellulose, starch, alkalinity control agents, acidity control agents, density control agents, density modifiers, emulsifiers, dispersants, polymeric stabilizers, polyacrylamides, a polymer or combination of polymers, antioxidants, heat stabilizers, foam control agents, solvents, diluents, plasticizer, filler or inorganic particles, pigments, dyes, precipitating agents, oil-wetting agents, set retarding additives, surfactants, gases, weight reducing additives, heavyweight additives, lost circulation materials, filtration control additives, salts (e.g., any suitable salt, such as potassium salts, such as potassium chloride, potassium bromide, potassium formate; calcium salts, such as calcium chloride, calcium bromide, calcium formate; cesium salts such as cesium chloride, cesium bromide, cesium formate; and the like; and any combination thereof), fibers, thixotropic additives, breakers, crosslinkers, rheology modifiers, curing accelerators, curing retarders, pH modifiers, chelating agents, scale inhibitors, enzymes, resins, water control materials, disproportionate permeability modifiers, relative permeability modifiers, oxidizers, markers, Portland cement, pozzolana cement, gypsum cement, high alumina content cement, slag cement, sorel cement (e.g., $Mg_4Cl_2(OH)_6(H_2O)_8$), micro matrix cement, silica cement, fly ash, metakaolin, shale, zeolite, a crystalline silica compound, amorphous silica, hydratable clays, microspheres, lime, or a combination thereof.

In various embodiments, the additional materials may include one or more commercially available components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the demulsifier composition or a mixture including the same can include one or more additive components such as: X-TEND® II, PACTM-R, PACTM-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEMTM, EZ-MUD®, CLAY GRABBER®, CLAYSEAL®, CRYSTAL-DRIL®, and CLAY SYNCTM II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARAC-ARB®, DUO-SQUEEZE®, BAROFIBRE™, STEEL-SEAL®, and HYDRO-PLUG® lost circulation management materials.

In various embodiments, the flowback aid composition(s) (collectively referring to the flowback aid composition(s) alone or included in a treatment fluid) disclosed herein can directly or indirectly affect one or more components or pieces of equipment associated with the preparation, delivery, recapture, recycling, reuse, and/or disposal of the flowback aid composition(s). For example, and with reference to FIG. 1, the flowback aid composition(s) can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The flowback aid composition can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the flowback aid composition(s) can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the flowback aid composition(s) can be stored, reconditioned, and/or regulated until added to the drilling fluid 122.

As mentioned above, the flowback aid composition can directly or indirectly affect the components and equipment of the drilling assembly 100. For example, the flowback composition can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the flowback aid composition.

The flowback aid composition can directly or indirectly affect the pump 120, which representatively includes any conduits, pipelines, trucks, tubulars, and/or pipes used to fluidically convey the flowback aid composition to the subterranean formation; any pumps, compressors, or motors (e.g., topside or downhole) used to drive the flowback aid composition into motion; any valves or related joints used to regulate the pressure or flow rate of the flowback aid composition; and any sensors (e.g., pressure, temperature, flow rate, and the like), gauges, and/or combinations thereof, and the like. The flowback aid composition can also directly or indirectly affect the mixing hopper 134 and the retention pit 132 and their assorted variations.

The flowback aid composition can also directly or indirectly affect the various downhole or subterranean equipment and tools that can come into contact with the flowback aid composition such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The flowback aid composition can also directly or indirectly affect any downhole heat exchangers, valves, and corresponding actuation devices, tool seals, packers, other wellbore isolation devices or components, and the like associated with the wellbore 116. The flowback aid composition can also directly or indirectly affect the drill bit 114, which can include roller cone bits, polycrystalline diamond compact (PDC) bits, natural diamond bits, hole openers, reamers, coring bits, and the like.

While not specifically illustrated herein, the flowback aid composition can also directly or indirectly affect any transport or delivery equipment used to convey the flowback aid composition to the drilling assembly 100 such as, for example, any transport vessels, conduits, pipelines, trucks, tubulars, and/or pipes used to fluidically move the flowback aid composition from one location to another; any pumps, compressors, or motors used to drive the flowback aid composition into motion; any valves or related joints used to regulate the pressure or flow rate of the flowback aid composition; and any sensors (e.g., pressure and temperature), gauges, and/or combinations thereof, and the like.

In various embodiments, the present disclosure provides systems configured for delivering the flowback aid compositions (again, collectively referring to the flowback aid compositions alone or within a treatment fluid) described herein to a downhole location. In various embodiments, the systems can comprise a pump fluidly coupled to a tubular, the tubular containing the flowback aid compositions described herein. It will be appreciated that while the system described below may be used for delivering any one of the flowback aid compositions described herein, each flowback aid composition is delivered separately into the subterranean formation, unless otherwise indicated.

The pump may be a high pressure pump in some embodiments. As used herein, the term "high pressure pump" will refer to a pump that is capable of delivering a flowback aid composition downhole at a pressure of about 1000 psi or greater. A high pressure pump may be used when it is desired to introduce the flowback aid composition to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the flowback aid composition to the high pressure pump. In such embodiments, the low pressure pump may "step up" the pressure of the flowback aid composition before reaching the high pressure pump.

In some embodiments, the systems described herein can further comprise a mixing tank that is upstream of the pump and in which the flowback aid composition are formulated. In various embodiments, the pump (e.g., a low pressure pump, a high pressure pump, or a combination thereof) may convey the flowback aid composition from the mixing tank or other source of the flowback aid composition to the tubular. In other embodiments, however, the flowback aid composition may be formulated offsite and transported to a worksite, in which case the flowback aid composition may be introduced to the tubular via the pump directly from its shipping container (e.g., a truck, a railcar, a barge, or the like) or from a transport pipeline. In either case, the flowback aid composition may be drawn into the pump, elevated to an appropriate pressure, and then introduced into the tubular for delivery downhole.

Figure 2:
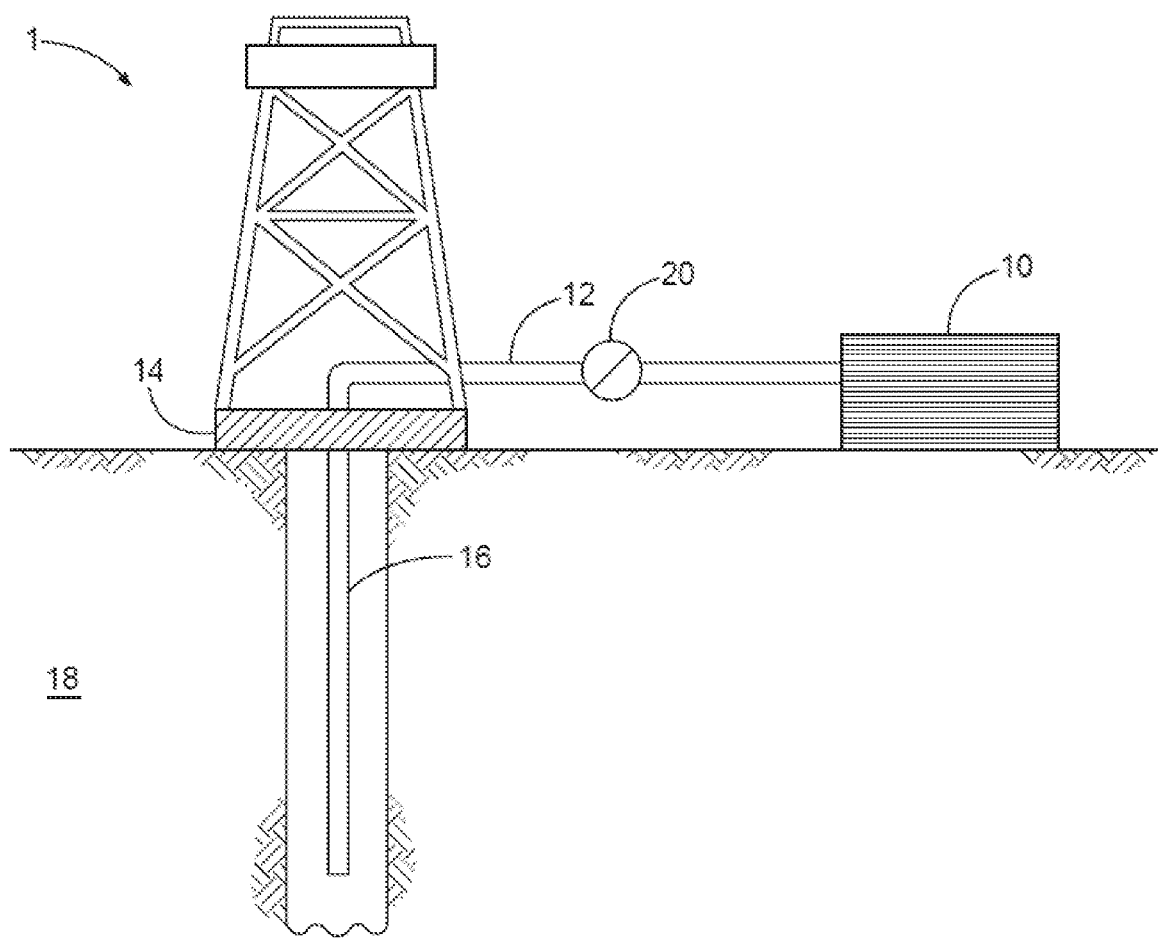
FIG. 2 depicts an embodiment of a system configured for delivering various treatment fluids of the embodiments described herein to a downhole location, in accordance with one or more embodiments of the present disclosure.

FIG. 2 shows an illustrative schematic of a system that can deliver the flowback aid composition(s) of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which the flowback aid composition of the embodiments herein may be formulated. The flowback aid composition may be conveyed via line 12 to wellhead 14, where the flowback aid composition enter tubular 16, tubular 16 extending from wellhead 14 into subterranean formation 18. Upon being ejected from tubular 16, the flowback aid composition may subsequently penetrate into subterranean formation 18. Pump 20 may be configured to raise the pressure of the flowback aid composition to a desired degree before introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the flowback aid composition or a portion thereof may, in some embodiments, flow back to wellhead 14 and exit subterranean formation 18. In some embodiments, the flowback aid composition that has flowed back to wellhead 14 may subsequently be recovered and recirculated to subterranean formation 18, or otherwise treated for use in a subsequent subterranean operation or for use in another industry.

It is also to be recognized that the disclosed flowback aid composition(s) may also directly or indirectly affect the various downhole equipment and tools that may come into contact with therewith during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A method comprising: introducing into a subterranean formation a flowback aid composition comprising: an aqueous phase comprising an aqueous base fluid; a surfactant blend comprising: a $C_8$-$C_{18}$ alcohol ethoxylate; a fatty acid alkanolamide; and optionally, a surfactant selected from the group consisting of a non-ionic surfactant, an anionic surfactant, a cationic surfactant, an amphoteric surfactant, and any combination thereof; and a demulsifier selected from the group consisting of a desalter agent to separate water from crude oil, a treater agent to flocculate submicron particulates from crude oil, and any combination thereof.

Embodiment B: A method comprising: introducing into a subterranean formation a flowback aid composition comprising: an aqueous phase comprising an aqueous base fluid; an oil phase comprising a high-solvency oil; a surfactant blend comprising: a $C_8$-$C_{18}$ alcohol ethoxylate; a fatty acid alkanolamide; and optionally, a surfactant selected from the group consisting of a non-ionic surfactant, an anionic surfactant, a cationic surfactant, an amphoteric surfactant, and any combination thereof; and a demulsifier selected from the group consisting of a desalter agent to separate water from crude oil, a treater agent to flocculate submicron particulates from crude oil, and any combination thereof.

Embodiment C: A flowback aid composition comprising: an aqueous phase comprising an aqueous base fluid; a surfactant blend comprising: a $C_8$-$C_{18}$ alcohol ethoxylate; a fatty acid alkanolamide; and optionally, a surfactant selected from the group consisting of a non-ionic surfactant, an anionic surfactant, a cationic surfactant, an amphoteric surfactant, and any combination thereof; and a demulsifier selected from the group consisting of a desalter agent to separate water from crude oil, a treater agent to flocculate submicron particulates from crude oil, and any combination thereof.

Each of Embodiments A, B, and C may have one or more of the following additional elements in any combination, without limitation:

Element 1: Wherein the flowback aid composition is a mesophase emulsion.

Element 2: Wherein the flowback aid composition comprises an oil phase comprising a high-solvency oil, and the flowback aid composition is a microemulsion or a nanoemulsion.

Element 3: Wherein the desalter agent is selected from the group consisting of a polyalkylene oxide polyol, a polyether polyol, a dedridic polyalkylene oxide polyol, and any combination thereof.

Element 4: Wherein the desalter agent is selected from the group consisting of Structure XV, Structure XVI, Structure XVII, and any combination thereof, as follows:

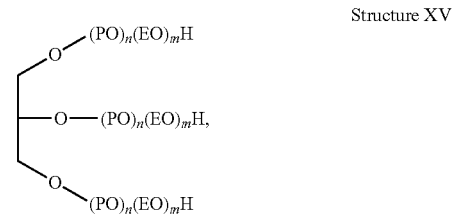

Structure XV wherein $(PO)_n$ represents moles of propylene oxide, $(EO)_m$ represents moles of ethylene oxide, n is an integer of from about 1 to about 15, and m is an integer of from about 1 to about 15;

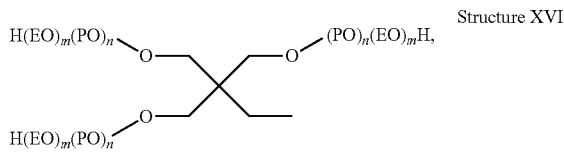

Structure XVI wherein $(PO)_n$ represents moles of propylene oxide, $(EO)_m$ represents moles of ethylene oxide, n is an integer of from about 1 to about 15, and m is an integer of from about 1 to about 15;

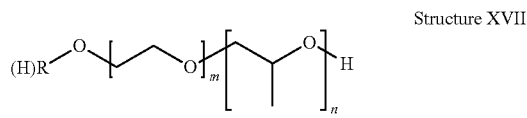

Structure XVII wherein R is H, C1, C2, C3, C4, or C6, m is an integer of from about 1 to about 20, and n is an integer of from about 1 to about 20.

Element 5: Wherein the treater agent is selected from the group consisting of a polyethyleneimine alkoxylate, an ethylenediamine alkoxylate, and any combination thereof.

Element 6: Wherein the treater agent is selected from the group consisting of Structure XVIII, Structure XIX, and any combination thereof, as follows:

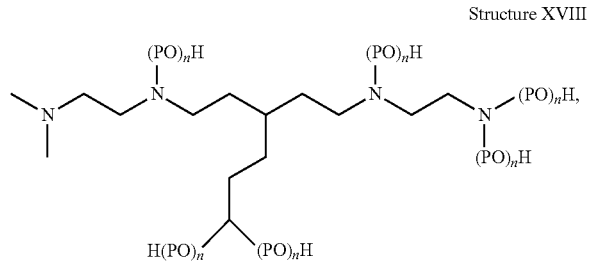

Structure XVIII wherein, $(PO)_n$ represents moles of propylene oxide, and n is an integer of from about 1 to about 10;

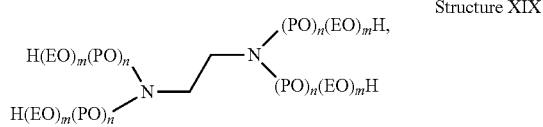

Structure XIX wherein, $(PO)_n$ represents moles of propylene oxide, $(EO)_m$ represents moles of ethylene oxide, n is an integer of from about 1 to about 10, and m is an integer of from about 1 to about 10.

Element 7: Wherein the flowback aid composition further comprises a dropper agent to coalesce and release free water.

Element 8: Wherein the flowback aid composition further comprises a dropper agent to coalesce and release free water, and the dropper agent is an alkoxylated alkylphenol resin.

Element 9: Wherein the flowback aid composition further comprises a flowback additive selected from the group consisting of an oil-soluble $C_8$-$C_{13}$ isoalcohol, an aqueous-soluble co-solvent, a co-surfactant, and any combination thereof.

Element 10: Further comprising introducing the flowback aid composition into a subterranean formation alone or in a treatment fluid at a pressure above a fracture gradient of the subterranean formation to create or enhance at least one fracture therein.

Element 11: Further comprising reducing or eliminating an emulsion present in a subterranean formation, reducing or eliminating formation of an emulsion in the subterranean formation, or reducing or eliminating both an emulsion present in the subterranean formation and formation of an emulsion in the subterranean formation.

Element 12: Further comprising introducing the flowback aid composition into a subterranean formation and wherein the subterranean formation comprises an emulsion of produced petroleum, and further comprising contacting the emulsion of produced petroleum with the flowback aid composition, thereby reducing or eliminating the emulsion of produced petroleum.

Element 13: Further comprising a tubular extending into a subterranean formation and fluidly coupled to a pump, the tubular containing the flowback aid composition.

By way of non-limiting example, exemplary combinations applicable to A, B, and/or C include: 1-13; 2, 3, and 5; 6 and 10; 1, 5, 8, and 15; 11, 12, and 13; 9 and 11; 4, 6, 7, 8, and 13; 2, 3, and 12; 1, 3, and 5; 2 and 7; 11, 12, and 13; and any combination of one, more than one, or all of 1-13, without limitation.

To facilitate a better understanding of the embodiments of the present disclosure, the following examples of preferred or representative embodiments is given. In no way should the following examples be read to limit, or to define, the scope of the present disclosure.

EXAMPLE 1

In this example, Formulae 747-815 were prepared according to Tables 1-9 to compare the ability of the flowback aid compositions described herein comprising high-solvency oil with traditional hydrocarbon solvents to form Winsor Type IV microemulsions in the presence of demulsifier(s). The components include various commercially available compounds, the type of which is provided in the following tables. The symbol "--" indicates that the particular component was not used in the listed Formula.

TABLE 1

| Component | Category | 747 | 748 | 749 | 750 | 751 | 752 | 753 | 754 |
|---|---|---|---|---|---|---|---|---|---|
| | | Volume Fraction (%) | | | | | | | |
| DI water | Water | 17.5 | 20.0 | 20.0 | 20.0 | 20.0 | 20.0 | 20.0 | 20.0 |
| ELEVANCE CLEAN ® 1000 | High-Solvency Oil | 6.0 | 9.0 | 10.0 | 10.0 | 10.0 | 10.0 | 10.0 | 10.0 |
| ESCAID ™ PATHFRAC ™ Fluid | Aromatic Oil | 2.5 | — | — | — | — | — | — | — |
| 1-Butanol | Co-Surfactant | 5.0 | 5.0 | 5.0 | 5.0 | 5.0 | 5.0 | 5.0 | 5.0 |
| 95% Ethanol | Co-Solvent | 34.0 | 34.0 | 35.0 | 35.0 | 35.0 | 35.0 | 35.0 | 35.0 |
| TERGITOL ™ 15-S-7 Surfactant | Ethyoxylated Alcohol | 5.0 | 5.0 | 6.0 | 6.0 | 6.0 | 6.0 | 6.0 | 6.0 |
| AMADOL ® 511 Surfactant | Alkanolamide | 5.0 | 5.0 | 6.0 | 6.0 | 6.0 | 6.0 | 6.0 | 6.0 |
| NINEX ® MT-615 Surfactant | Fatty Acid Ethoxylate | 5.0 | 5.0 | 6.0 | 6.0 | 6.0 | 6.0 | 6.0 | 6.0 |
| CLEARBREAK ® 8967 Surfactant | Alkoxylated Alkylphenol Resin | 18.0 | 15.0 | 10.0 | — | — | — | — | — |
| BASOROL ® P-DB 9429 Surfactant | Alkoxylated Alkylphenol Resin | — | — | — | 10.0 | — | — | — | — |
| BASOROL ® P-DB 9935 Surfactant | Alkoxylated Alkylphenol Resin | — | — | — | — | 10.0 | — | — | — |

TABLE 1-continued

| Component | Category | 747 | 748 | 749 | 750 | 751 | 752 | 753 | 754 |
|---|---|---|---|---|---|---|---|---|---|
| | | Volume Fraction (%) | | | | | | | |
| BASOROL ® P-DB 9945 Surfactant | Alkoxylated Alkylphenol Resin | — | — | — | — | — | 10.0 | — | — |
| BASOROL ® P-DB 9947 Surfactant | Alkoxylated Alkylphenol Resin | — | — | — | — | — | — | 10.0 | — |
| BASOROL ® P-DB 9954A Surfactant | Alkoxylated Alkylphenol Resin | — | — | — | — | — | — | — | 10.0 |
| EXXAL ™ 13 | Isotridecyl Alcohol | 2.0 | 2.0 | 2.0 | 2.0 | 2.0 | 2.0 | 2.0 | 2.0 |

TABLE 2

| Component | Category | 755 | 756 | 757 | 758 | 759 | 760 | 761 | 762 |
|---|---|---|---|---|---|---|---|---|---|
| | | Volume Fraction (%) | | | | | | | |
| DI water | Water | 20.0 | 20.0 | 20.0 | 20.0 | 20.0 | 20.0 | 20.0 | 20.0 |
| ELEVANCE CLEAN ® 1000 | High-Solvency Oil | 10.0 | 10.0 | 10.0 | 10.0 | 10.0 | 10.0 | 10.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 35.0 | 35.0 | 35.0 | 35.0 | 35.0 | 35.0 | 35.0 | 35.0 |
| TERGITOL ™ 15-S-7 Surfactant | Ethyoxylated Alcohol | 6.0 | 6.0 | 6.0 | 6.0 | 6.0 | 6.0 | 6.0 | 6.0 |
| AMADOL ® 511 Surfactant | Alkanolamide | 6.0 | 6.0 | 6.0 | 6.0 | 6.0 | 6.0 | 6.0 | 6.0 |
| NINEX ® MT-615 Surfactant | Fatty Acid Ethoxylate | 6.0 | 6.0 | 6.0 | 6.0 | 6.0 | 6.0 | 6.0 | 6.0 |
| BASOROL ® P-DB 9955 Surfactant | Alkoxylated Alkylphenol Resin | 10.0 | — | — | — | — | — | — | — |
| BASOROL ® P-DB 9934 Surfactant | Alkoxylated Alkylphenol Resin | — | 10.0 | — | — | — | — | — | — |
| BASOROL ® P-DB 9946 Surfactant | Alkoxylated Alkylphenol Resin | — | — | 10.0 | — | — | — | — | — |
| BASOROL ® P-DB 9954 Surfactant | Alkoxylated Alkylphenol Resin | — | — | — | 10.0 | — | — | — | — |
| BASOROL ® P-DB 9958 Surfactant | Alkoxylated Alkylphenol Resin | — | — | — | — | 10.0 | — | — | — |
| BASOROL ® 17R4 Surfactant | EO/PO Block Copolymer | — | — | — | — | — | 10.0 | — | — |
| BASOROL ® 25R2 Surfactant | EO/PO Block Copolymer | — | — | — | — | — | — | 10.0 | — |
| BASOROL ® L31 Surfactant | EO/PO Block Copolymer | — | — | — | — | — | — | — | 10.0 |
| EXXAL ™ 13 | Isotridecyl Alcohol | 2.0 | 2.0 | 2.0 | 2.0 | 2.0 | 2.0 | 2.0 | 2.0 |

TABLE 3

| Component | Category | 763 | 764 | 765 | 766 | 767 | 768 | 769 | 770 |
|---|---|---|---|---|---|---|---|---|---|
| | | Volume Fraction (%) | | | | | | | |
| DI water | Water | 20.0 | 20.0 | 20.0 | 20.0 | 20.0 | 20.0 | 20.0 | 20.0 |
| ELEVANCE CLEAN ® 1000 | High-Solvency Oil | 10.0 | 10.0 | 10.0 | 10.0 | 10.0 | 10.0 | 10.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 35.0 | 35.0 | 35.0 | 35.0 | 35.0 | 35.0 | 35.0 | 35.0 |
| TERGITOL ™ 15-S-7 Surfactant | Ethyoxylated Alcohol | 6.0 | 6.0 | 6.0 | 6.0 | 6.0 | 6.0 | 6.0 | 6.0 |
| AMADOL ® 511 Surfactant | Alkanolamide | 6.0 | 6.0 | 6.0 | 6.0 | 6.0 | 6.0 | 6.0 | 6.0 |
| NINEX ® MT-615 Surfactant | Fatty Acid Ethoxylate | 6.0 | 6.0 | 6.0 | 6.0 | 6.0 | 6.0 | 6.0 | 6.0 |
| BASOROL ® L 61 Surfactant | EO/PO Block Copolymer | 10.0 | — | — | — | — | — | — | — |
| BASOROL ® L 62 Surfactant | EO/PO Block Copolymer | — | 10.0 | — | — | — | — | — | — |

TABLE 3-continued

| Component | Category | 763 | 764 | 765 | 766 | 767 | 768 | 769 | 770 |
|---|---|---|---|---|---|---|---|---|---|
| | | | | Volume Fraction (%) | | | | | |
| BASOROL ® L 101 Surfactant | EO/PO Block Copolymer | — | — | 10.0 | — | — | — | — | — |
| BASOROL ® P 17R2 Surfactant | EO/PO Block Copolymer | — | — | — | 10.0 | — | — | — | — |
| BASOROL ® PE 6400 Surfactant | EO/PO Block Copolymer | — | — | — | — | 10.0 | — | — | — |
| BASOROL ® PE 10100 Surfactant | EO/PO Block Copolymer | — | — | — | — | — | 10.0 | — | — |
| BASOROL ® G 3218 Surfactant | Polyether Polyol | — | — | — | — | — | — | 10.0 | — |
| BASOROL ® G 6523 Surfactant | Polyether Polyol | — | — | — | — | — | — | — | 10.0 |
| EXXAL ™ 13 | Isotridecyl Alcohol | 2.0 | 2.0 | 2.0 | 2.0 | 2.0 | 2.0 | 2.0 | 2.0 |

TABLE 4

| Component | Category | 771 | 772 | 773 | 774 | 775 | 776 | 777 | 778 |
|---|---|---|---|---|---|---|---|---|---|
| | | | | Volume Fraction (%) | | | | | |
| DI water | Water | 20.0 | 20.0 | 20.0 | 20.0 | 20.0 | 20.0 | 20.0 | 20.0 |
| ELEVANCE CLEAN ® 1000 | High-Solvency Oil | 10.0 | 10.0 | 10.0 | 10.0 | 10.0 | 10.0 | 10.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 35.0 | 35.0 | 35.0 | 35.0 | 35.0 | 35.0 | 35.0 | 35.0 |
| TERGITOL ™ 15-S-7 Surfactant | Ethyoxylated Alcohol | 6.0 | 6.0 | 6.0 | 6.0 | 6.0 | 6.0 | 6.0 | 6.0 |
| AMADOL ® 511 Surfactant | Alkanolamide | 6.0 | 6.0 | 6.0 | 6.0 | 6.0 | 6.0 | 6.0 | 6.0 |
| NINEX ® MT-615 Surfactant | Fatty Acid Ethoxylate | 6.0 | 6.0 | 6.0 | 6.0 | 6.0 | 6.0 | 6.0 | 6.0 |
| BASOROL ® K 1026 Surfactant | Polyether Polyol | 10.0 | — | — | — | — | — | — | — |
| BASOROL ® K 1135I Surfactant | Polyether Polyol | — | 10.0 | — | — | — | — | — | — |
| BASOROL ® K 2090 Surfactant | Polyether Polyol | — | — | 10.0 | — | — | — | — | — |
| BASOROL ® K 3800 Surfactant | Polyether Polyol | — | — | — | 10.0 | — | — | — | — |
| BASOROL ® 150R1 Surfactant | Tetrol EO/PO Block Copolymer | — | — | — | — | 10.0 | — | — | — |
| BASOROL ® P-DB 5951 Surfactant | Tetrol EO/PO Block Copolymer | — | — | — | — | — | 10.0 | — | — |
| BASOROL ® 904 Surfactant | Tetrol EO/PO Block Copolymer | — | — | — | — | — | — | 10.0 | — |
| BASOROL ® P-DB 9360 Surfactant | PEI Alkoxylate | — | — | — | — | — | — | — | 10.0 |
| EXXAL ™ 13 | Isotridecyl Alcohol | 2.0 | 2.0 | 2.0 | 2.0 | 2.0 | 2.0 | 2.0 | 2.0 |

TABLE 5

| Component | Category | 779 | 780 | 781 | 782 | 783 | 784 | 785 | 786 |
|---|---|---|---|---|---|---|---|---|---|
| | | | | Volume Fraction (%) | | | | | |
| DI water | Water | 20.0 | 20.0 | 20.0 | 20.0 | 20.0 | 20.0 | 20.0 | 20.0 |
| ELEVANCE CLEAN ® 1000 | High-Solvency Oil | 10.0 | 10.0 | 10.0 | 10.0 | 9.0 | 10.0 | 9.0 | 10.0 |
| ESCAID ™ PATHFRAC ™ Fluid | Aromatic Oil | 2.5 | — | — | — | — | — | — | — |
| 1-Butanol | Co-Surfactant | 5.0 | 5.0 | 5.0 | 5.0 | 5.0 | 5.0 | 5.0 | 5.0 |
| 95% Ethanol | Co-Solvent | 35.0 | 35.0 | 35.0 | 35.0 | 34.0 | 35.0 | 34.0 | 35.0 |
| TERGITOL ™ 15-S-7 Surfactant | Ethyoxylated Alcohol | 6.0 | 6.0 | 6.0 | 6.0 | 5.0 | 6.0 | 5.0 | 6.0 |
| AMADOL ® 511 Surfactant | Alkanolamide | 6.0 | 6.0 | 6.0 | 6.0 | 5.0 | 6.0 | 5.0 | 6.0 |
| NINEX ® MT-615 Surfactant | Fatty Acid Ethoxylate | 6.0 | 6.0 | 6.0 | 6.0 | 5.0 | 6.0 | 5.0 | 6.0 |

TABLE 5-continued

| Component | Category | 779 | 780 | 781 | 782 | 783 | 784 | 785 | 786 |
|---|---|---|---|---|---|---|---|---|---|
| | | \multicolumn{8}{c}{Volume Fraction (%)} | | | | | | | |
| BASOROL ® P-DB 9360 Surfactant | PEI Alkoxylate | 10.0 | — | — | — | — | — | — | — |
| BASOROL ® P-DB 9392 Surfactant | PEI Alkoxylate | — | 10.0 | — | — | — | — | — | — |
| BASOROL ® P-BD 9393 Surfactant | PEI Alkoxylate | — | — | 10.0 | — | — | — | — | — |
| CLEARBREAK ® 8967 Surfactant | Alkoxylated Alkylphenol Resin | — | — | — | 10.0 | 15.0 | 10.0 | 15.0 | 10.0 |
| EXXAL ™ 13 | Isotridecyl Alcohol | 2.0 | 2.0 | 2.0 | — | 2.0 | 2.0 | — | — |
| BIO-SOFT ® N-300 Surfactant | Triethanolamine Linear Alkylate Sulfonate | — | — | — | 2.0 | — | — | 2.0 | 2.0 |

TABLE 6

| Component | Category | 787 | 788 | 789 | 790 | 791 | 792 | 793 | 794 |
|---|---|---|---|---|---|---|---|---|---|
| | | \multicolumn{8}{c}{Volume Fraction (%)} | | | | | | | |
| DI water | Water | 20.0 | 20.0 | 20.0 | 20.0 | 20.0 | 20.0 | 20.0 | 20.0 |
| ESCAID ™ PATHFRAC ™ Fluid | Aromatic Oil | 9.0 | 10.0 | 9.0 | 10.0 | — | — | — | — |
| Orange Terpene | Orange Oil | — | — | — | — | 9.0 | 10.0 | 9.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 34.0 | 35.0 | 34.0 | 35.0 | 34.0 | 35.0 | 34.0 | 35.0 |
| TERGITOL ™ 15-S-7 surfactant | Ethyoxylated Alcohol | 5.0 | 6.0 | 5.0 | 6.0 | 5.0 | 6.0 | 5.0 | 6.0 |
| AMADOL ® 511 Surfactant | Alkanolamide | 5.0 | 6.0 | 5.0 | 6.0 | 5.0 | 6.0 | 5.0 | 6.0 |
| NINEX ® MT-615 Surfactant | Fatty Acid Ethoxylate | 5.0 | 6.0 | 5.0 | 6.0 | 5.0 | 6.0 | 5.0 | 6.0 |
| CLEARBREAK ® 8967 Surfactant | Alkoxylated Alkylphenol Resin | 15.0 | 10.0 | 15.0 | 10.0 | 15.0 | 10.0 | 15.0 | 10.0 |
| DOWFAX ™ 2A1 Surfactant | Diphenyl Oxide Derived | 2.0 | 2.0 | — | — | — | — | — | — |
| DOWFAX ™ 3B2 Surfactant | Diphenyl Oxide Derived | — | — | 2.0 | 2.0 | — | — | — | — |
| EXXAL ™ 13 | Isotridecyl Alcohol | — | — | — | — | 2.0 | 2.0 | — | — |
| BIO-SOFT ® N-300 Surfactant | Triethanolamine Linear Alkylate Sulfonate | — | — | — | — | — | — | 2.0 | 2.0 |

TABLE 7

| Component | Category | 795 | 796 | 797 | 798 | 799 | 800 | 801 | 802 |
|---|---|---|---|---|---|---|---|---|---|
| | | \multicolumn{8}{c}{Volume Fraction (%)} | | | | | | | |
| DI water | Water | 20.0 | 20.0 | 20.0 | 20.0 | 20.0 | 20.0 | 20.0 | 20.0 |
| ESCAID ™ PATHFRAC ™ Fluid | Aromatic Oil | 9.0 | 10.0 | 9.0 | 10.0 | 9.0 | 10.0 | — | — |
| ELEVANCE CLEAN ® 1000 | High-Solvency Oil | — | — | — | — | — | — | 9.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 34.0 | 35.0 | 34.0 | 35.0 | 34.0 | 35.0 | 34.0 | 35.0 |
| TERGITOL ™ 15-S-7 Surfactant | Ethyoxylated Alcohol | 5.0 | 6.0 | 5.0 | 6.0 | 5.0 | 6.0 | 6.0 | 7.0 |
| AMADOL ® 511 Surfactant | Alkanolamide | 5.0 | 6.0 | 5.0 | 6.0 | 5.0 | 6.0 | 5.0 | 6.0 |
| NINEX ® MT-615 Surfactant | Fatty Acid Ethoxylate | 5.0 | 6.0 | 5.0 | 6.0 | 5.0 | 6.0 | 5.0 | 6.0 |
| CLEARBREAK ® 8967 Surfactant | Alkoxylated Alkylphenol Resin | 15.0 | 10.0 | 15.0 | 10.0 | 15.0 | 10.0 | 15.0 | 10.0 |
| AMMONYX ® LMDO Surfactant | Amine Oxide | 2.0 | 2.0 | 2.0 | 2.0 | 2.0 | 2.0 | — | — |

TABLE 8

| Component | Category | 803 | 804 | 805 | 806 | 807 | 808 | 809 | 810 |
|---|---|---|---|---|---|---|---|---|---|
| | | Volume Fraction (%) | | | | | | | |
| DI water | Water | 20.0 | 20.0 | 20.0 | 20.0 | 20.0 | 20.0 | 20.0 | 30.0 |
| ELEVANCE CLEAN ® 1000 | High-Solvency Oil | 9.0 | 10.0 | 9.0 | 9.0 | 9.0 | 9.0 | 9.0 | 10.0 |
| 1-Butanol | Co-Surfactant | 5.0 | 5.0 | 5.0 | 5.0 | 5.0 | 5.0 | 5.0 | 5.0 |
| 95% Ethanol | Co-Solvent | 34.0 | 35.0 | 34.0 | 34.0 | 34.0 | 34.0 | 34.0 | 25.0 |
| TERGITOL™ 15-S-7 surfactant | Ethyoxylated Alcohol | 5.0 | 6.0 | 5.0 | 5.0 | 5.0 | 5.0 | 5.0 | 6.0 |
| AMADOL ® 511 Surfactant | Alkanolamide | 5.0 | 6.0 | — | — | — | — | — | 6.0 |
| AMADOL ® 1017 Surfactant | Alkanolamide | — | — | 5.0 | — | — | — | — | — |
| AMADOL ® 5133 Surfactant | Alkanolamide | — | — | — | 5.0 | — | — | — | — |
| AMADOL ® 5195 Surfactant | Alkanolamide | — | — | — | — | 5.0 | — | — | — |
| NINOL 49-C | Alkanolamide | — | — | — | — | — | 5.0 | — | — |
| NINOL C-5 | Alkanolamide | — | — | — | — | — | — | 5.0 | — |
| NINEX ® MT-615 Surfactant | Fatty Acid Ethoxylate | — | — | — | — | — | — | — | 6.0 |
| CLEARBREAK ® 8967 Surfactant | Alkoxylated Alkylphenol Resin | 15.0 | 10.0 | 15.0 | 10.0 | 15.0 | 10.0 | 15.0 | 10.0 |
| AMMONYX ® LMDO Surfactant | Amine Oxide | 2.0 | 2.0 | 2.0 | 2.0 | 2.0 | 2.0 | — | — |

TABLE 9

| Component | Category | 811 | 812 | 813 | 814 | 815 |
|---|---|---|---|---|---|---|
| | | Volume Fraction (%) | | | | |
| DI water | Water | 35.0 | 30.0 | 35.0 | 28.0 | 33.0 |
| ELEVANCE CLEAN ® 1000 | High-Solvency Oil | 10.0 | 10.0 | 10.0 | 10.0 | 10.0 |
| 1-Butanol | Co-Surfactant | 5.0 | 5.0 | 5.0 | 5.0 | 5.0 |
| 95% Ethanol | Co-Solvent | 20.0 | 25.0 | 20.0 | 25.0 | 20.0 |
| TERGITOL™ 15-S-7 surfactant | Ethyoxylated Alcohol | 6.0 | 6.0 | 6.0 | 5.0 | 5.0 |
| AMADOL ® 511 Surfactant | Alkanolamide | 6.0 | 6.0 | 6.0 | 5.0 | 5.0 |
| NINEX ® MT-615 Surfactant | Fatty Acid Ethoxylate | 6.0 | 6.0 | 6.0 | 5.0 | 5.0 |
| BASOROL ® P-DB 9429 Surfactant | Alkoxylated Alkylphenol Resin | 10.0 | — | — | 7.5 | 7.5 |
| BASOROL ® P-DB 9954 Surfactant | Alkoxylated Alkylphenol Resin | — | 10.0 | 10.0 | 7.5 | 7.5 |
| EXXAL™ 13 | Isotridecyl Alcohol | 2.0 | 2.0 | 2.0 | 2.0 | 2.0 |

The following visual observations were made on Formulas 747-815 are provided in Table 10 below. As shown, Formulae 747-782 and 801-812 exhibit Winsor Type IV clear single phase microemulsions in which a high-solvency oil is included in the formulation, according to one or more embodiments of the present disclosure. That is, for Formulae 747-782 and 801-812, the high-solvency oil in combination with the various components in the flowback aid composition was able to solubilize the demulsifier components to form the Winsor Type IV microemulsions. Formulae 791-794 included orange terpene oil and also exhibited Winsor Type IV clear single phase microemulsions, where such orange terpenes are able to ready form such Type IV microemulsions in the presence of alkoxylated phenolic resins. Differently, the use of mere alkane/isoalkane solvent oils is ineffective and unable to form such Type IV microemulsions in the presence of demulsifiers. Instead, as shown with Formulae 783-790 and 795-800, the combination of alkane/isoalkane solvent oils and demulsifiers, such as alkoxylated phenolic resins, resulted in a Winsor Type I microemulsion characterized by two phases, in which a clear aqueous phase and a clear oil phase was observed, the clear aqueous phase microemulsion being dominant.

TABLE 10

| Formula No. | Visual Emulsion Phase Observation (Microemulsions) |
|---|---|
| 747 | single clear phase (Type IV) |
| 748 | single clear phase (Type IV) |
| 749 | single clear phase (Type IV) |
| 750 | single clear phase (Type IV) |
| 751 | single clear phase (Type IV) |
| 752 | single clear phase (Type IV) |
| 753 | single clear phase (Type IV) |
| 754 | single clear phase (Type IV) |
| 755 | single clear phase (Type IV) |
| 756 | single clear phase (Type IV) |
| 757 | single clear phase (Type IV) |
| 758 | single clear phase (Type IV) |
| 759 | single clear phase (Type IV) |
| 760 | single clear phase (Type IV) |
| 761 | single clear phase (Type IV) |
| 762 | single clear phase (Type IV) |
| 763 | single clear phase (Type IV) |
| 764 | single clear phase (Type IV) |
| 765 | single clear phase (Type IV) |
| 766 | single clear phase (Type IV) |
| 767 | single clear phase (Type IV) |
| 768 | single clear phase (Type IV) |
| 769 | single clear phase (Type IV) |
| 770 | single clear phase (Type IV) |
| 771 | single clear phase (Type IV) |
| 772 | single clear phase (Type IV) |
| 773 | single clear phase (Type IV) |
| 774 | single clear phase (Type IV) |
| 775 | single clear phase (Type IV) |
| 776 | single clear phase (Type IV) |
| 777 | single clear phase (Type IV) |
| 778 | single clear phase (Type IV) |
| 779 | single clear phase (Type IV) |
| 780 | single clear phase (Type IV) |
| 781 | single clear phase (Type IV) |
| 782 | single clear phase (Type IV) |

TABLE 10-continued

| Formula No. | Visual Emulsion Phase Observation (Microemulsions) |
|---|---|
| 783 | two phases, clear aqueous phase dominant, clear oil phase (Type I) |
| 784 | two phases, clear aqueous phase dominant, clear oil phase (Type I) |
| 785 | two phases, clear aqueous phase dominant, clear oil phase (Type I) |
| 786 | two phases, clear aqueous phase dominant, clear oil phase (Type I) |
| 787 | two phases, clear aqueous phase dominant, clear oil phase (Type I) |
| 788 | two phases, clear aqueous phase dominant, clear oil phase (Type I) |
| 789 | two phases, clear aqueous phase dominant, clear oil phase (Type I) |
| 790 | two phases, clear aqueous phase dominant, clear oil phase (Type I) |
| 791 | single clear phase (Type IV) |
| 792 | single clear phase (Type IV) |
| 793 | single clear phase (Type IV) |
| 794 | single clear phase (Type IV) |
| 795 | two phases, clear aqueous phase dominant, clear oil phase (Type I) |
| 796 | two phases, clear aqueous phase dominant, clear oil phase (Type I) |
| 797 | two phases, clear aqueous phase dominant, clear oil phase (Type I) |
| 798 | two phases, clear aqueous phase dominant, clear oil phase (Type I) |
| 799 | two phases, clear aqueous phase dominant, clear oil phase (Type I) |
| 800 | two phases, clear aqueous phase dominant, clear oil phase (Type I) |
| 801 | single clear phase (Type IV) |
| 802 | single clear phase (Type IV) |
| 803 | single clear phase (Type IV) |
| 804 | single clear phase (Type IV) |
| 805 | single clear phase (Type IV) |
| 806 | single clear phase (Type IV) |
| 807 | single clear phase (Type IV) |
| 808 | single clear phase (Type IV) |
| 809 | single clear phase (Type IV) |
| 810 | single clear phase (Type IV) |
| 811 | single clear phase (Type IV) |
| 812 | single clear phase (Type IV) |
| 813 | single clear phase (Type IV) |
| 814 | single clear phase (Type IV) |
| 815 | single clear phase (Type IV) |

EXAMPLE 2

In this example, various selected formulae encompassed in 747-782, 791-794, 801, and 802 of Example 1 were tested to determine their RockPerm$^{SM}$ service values. The values determined by the following procedure. A glass column was provided. The hosecock (stopper) on the column was closed. Formation water (10 milliliters (mL), 7% KCl) was added to the column. Proppant (100 mesh sand, 10 grams (g)) was slowly added to the formation water. The column was vibrated for 10 seconds to pack the sand. The hosecock was opened and the formation water was allowed to flow until the meniscus reached the top of the sand bed. The pore volume (PV) of the sand bed was measured by measuring the volume of water in the sand bed. The proppant was treated with 3 pore volumes (3 PV) of a broken fracturing fluid (7% KCl) containing 2 gallons per thousand gallons (gpt) of the selected flowback aid composition. The broken fracturing fluid was drained from the column until the meniscus reached the top of the sand bed. The hosecock of the column was closed. Formation oil was added to the 15 mL mark (the 0 mL mark is at the bottom of the column). The hosecock was opened, and the fracturing fluid displaced by the oil was collected over time. The procedure was stopped when the formation oil broke through the sand bed or at the 2 hour mark, whichever happened first. The time the oil broke through was called the breakthrough time (BTT). The weight of the fracturing fluid displaced at the BTT or at the 2 h mark (if the oil did not breakthrough) was measured. The RockPerm$^{SM}$ service Value (RPV) was estimated as RPV=(weight of fluid displaced (g)/BTT (h))*(weight of fluid displaced (g)/PV (mL)). The RPVs of Formulae 747-782, 791-794, 801, and 802 are shown in Table 11 below.

TABLE 11

| Formula No. | RPV |
|---|---|
| 747 | 33.1 |
| 748 | 31.4 |
| 749 | 16.8 |
| 750 | 62.2 |
| 751 | 0.0 |
| 752 | 4.1 |
| 753 | 0.3 |
| 754 | 41.2 |
| 755 | 39.6 |
| 756 | 30.4 |
| 757 | 13.8 |
| 758 | 67.0 |
| 759 | 0.2 |
| 760 | 1.2 |
| 761 | 18.3 |
| 762 | 0.1 |
| 763 | 0.0 |
| 764 | 2.2 |
| 765 | 0.0 |
| 766 | 0.1 |
| 767 | 3.4 |
| 768 | 2.7 |
| 769 | 26.6 |
| 770 | 37.0 |
| 771 | 0.0 |
| 772 | 2.8 |
| 773 | 0.5 |
| 774 | 0.2 |
| 775 | 36.5 |
| 776 | 2.8 |
| 777 | 0.5 |
| 778 | 0.7 |
| 779 | 2.5 |
| 780 | 0.2 |
| 781 | 1.6 |
| 782 | 14.5 |
| 791 | 50.6 |
| 792 | 37.2 |
| 793 | 17.6 |
| 794 | 23.2 |
| 801 | 25.7 |
| 802 | 19.0 |

Selected Formulae from Tables 1-9 including at least 749, 750, 754-756, 758, 761, 769, 770, and 775 exhibited high RPVs, indicating that such Formulae are as high performance formulations. The RPVs for these selected Formulae are shown to two decimal points in Table 12 below.

TABLE 12

| Formula No. | RPV |
|---|---|
| 749 | 16.82 |
| 750 | 62.16 |
| 754 | 41.21 |
| 755 | 39.57 |
| 756 | 30.37 |
| 758 | 67.01 |
| 761 | 18.28 |
| 769 | 26.57 |
| 770 | 36.98 |
| 775 | 36.53 |

As can be seen, the RPVs for each formulation are greater than 10, which the highest RPVs including alkoxylated alkylphenol resin dropper agents (750, 754-756, and 758), followed by pholyether polyol desalter agents (769 and 770), tetrol EO/PO block copolymers (775), EO/PO block copolymers (761), and CLEARBREAK® alkoxylated alkylphenol resin dropper agent (749).

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing into a subterranean formation a flowback aid composition comprising:
        an aqueous phase comprising an aqueous base fluid;
        a surfactant blend comprising:
            a $C_8$-$C_{18}$ alcohol ethoxylate;
            a fatty acid alkanolamide; and
            a surfactant selected from the group consisting of a non-ionic surfactant, an anionic surfactant, a cationic surfactant, an amphoteric surfactant, and any combination thereof;
        a demulsifier selected from the group consisting of a desalter agent to separate water from crude oil, a treater agent to flocculate submicron particulates from crude oil, and any combination thereof,
        an aqueous-soluble co-solvent;
        an oil phase comprising a high-solvency oil, and
        wherein the flowback aid compensation is a microemulsion or a nanoemulsion.

2. The method of claim 1, wherein the flowback aid composition is a mesophase emulsion.

3. The method of claim 1, wherein the desalter agent is selected from the group consisting of a polyalkylene oxide polyol, a polyether polyol, a dedridic polyalkylene oxide polyol, and any combination thereof.

4. The method of claim 1, wherein the desalter agent is selected from the group consisting of Structure XV, Structure XVI, Structure XVII, and any combination thereof, as follows:

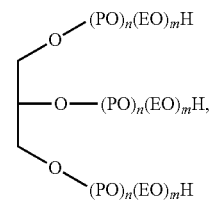

Structure XV wherein $(PO)_n$ represents moles of propylene oxide, $(EO)_m$ represents moles of ethylene oxide, n is an integer of from about 1 to about 15, and m is an integer of from about 1 to about 15;

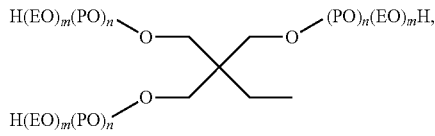

Structure XVI wherein $(PO)_n$ represents moles of propylene oxide, $(EO)_m$ represents moles of ethylene oxide, n is an integer of from about 1 to about 15 and m is an integer of from about 1 to about 15;

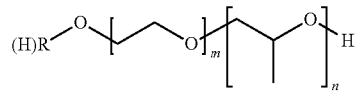

Structure XVII wherein R is H, $C_1$, $C_2$, $C_3$, $C_4$, or $C_6$, m is an integer of from about 1 to about 20, and n is an integer of from about 1 to about 20.

5. The method of claim 1, wherein the treater agent is selected from the group consisting of a polyethyleneimine alkoxylate, an ethylenediamine alkoxylate, and any combination thereof.

6. The method of claim 1, wherein the treater agent is selected from the group consisting of Structure XVIII, Structure XIX, and any combination thereof, as follows:

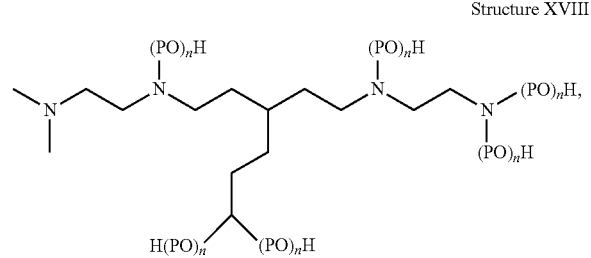

Structure XVIII wherein, $(PO)_n$ represents moles of propylene oxide, and n is an integer of from about 1 to about 10;

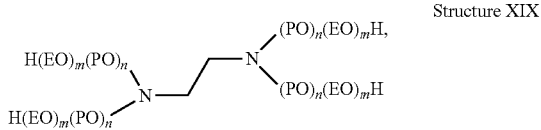

Structure XIX wherein, $(PO)_n$ represents moles of propylene oxide, $(EO)_m$ represents moles of ethylene oxide, n is an integer of from about 1 to about 10, and m is an integer of from about 1 to about 10.

7. The method of claim 1, wherein the flowback aid composition further comprises a dropper agent to coalesce and release free water.

8. The method of claim 1, wherein the flowback aid composition further comprises a dropper agent to coalesce and release free water, and the dropper agent is an alkoxylated alkylphenol resin.

9. The method of claim 1, further comprising introducing the flowback aid composition into the subterranean formation alone or in a treatment fluid at a pressure above a fracture gradient of the subterranean formation to create or enhance at least one fracture therein.

10. The method of claim 1, further comprising reducing or eliminating an emulsion present in the subterranean formation, reducing or eliminating formation of an emulsion in the subterranean formation, or reducing or eliminating both an emulsion present in the subterranean formation and formation of an emulsion in the subterranean formation.

11. The method of claim 1, wherein the subterranean formation comprises an emulsion of produced petroleum, and further comprising contacting the emulsion of produced petroleum with the flowback aid composition, thereby reducing or eliminating the emulsion of produced petroleum.

12. The method of claim 1, further comprising a tubular extending into the subterranean formation and fluidly coupled to a pump, the tubular containing the flowback aid composition.

13. A method comprising:
introducing into a subterranean formation a flowback aid composition comprising:
an aqueous phase comprising an aqueous base fluid;
an oil phase comprising a high-solvency oil;
a surfactant blend comprising:
a $C_8$-$C_{18}$ alcohol ethoxylate;
a fatty acid alkanolamide; and
a surfactant selected from the group consisting of a non-ionic surfactant, an anionic surfactant, a cationic surfactant, an amphoteric surfactant, and any combination thereof;
a demulsifier selected from the group consisting of a desalter agent to separate water from crude oil,
an aqueous-soluble co-solvent;
a dropper agent in coalesce and release free water, and the dropper agent is an alkoxylated alkylphenol resin, and
wherein the flowback aid composition is a microemulsion or a nanoemulsion.

14. The method of claim 13, further comprising reducing or eliminating an emulsion present in the subterranean formation, reducing or eliminating formation of an emulsion in the subterranean formation, or reducing or eliminating both an emulsion present in the subterranean formation and formation of an emulsion in the subterranean formation by contact with the flowback fluid.

15. A flowback aid composition comprising:
an aqueous phase comprising an aqueous base fluid;
a surfactant blend comprising:
a $C_8$-$C_{18}$ alcohol ethoxylate;
a fatty acid alkanolamide; and
a surfactant selected from the group consisting of a non-ionic surfactant, an anionic surfactant, a cationic surfactant, an amphoteric surfactant, and any combination thereof; and
a demulsifier selected from the group consisting of a desalter agent to separate water from crude oil, a treater agent to flocculate submicron particulates from crude oil, and any combination thereof.

16. The flowback aid composition of claim 15, wherein the flowback aid composition is a mesophase emulsion.

17. The flowback aid composition of claim 15, wherein the flowback aid composition further comprises an oil phase comprising a high-solvency oil, and the flowback aid composition is a microemulsion or a nanoemulsion.

18. The method of claim 13, wherein the desalter agent is selected from the group consisting of a polyalkylene oxide polyol, a polyether polyol, a dedridic polyalkylene oxide polyol, and any combination thereof.

19. The method of claim 13, further comprising introducing the flowback aid composition into the subterranean formation alone or in a treatment fluid at a pressure above a fracture gradient of the subterranean formation to create or enhance at least one fracture therein.

20. The method of claim 13, wherein the subterranean formation comprises an emulsion of produced petroleum, and further comprising contacting the emulsion of produced petroleum with the flowback aid composition, thereby reducing or eliminating the emulsion of produced petroleum.

* * * * *